(12) United States Patent
Chang et al.

(10) Patent No.: US 9,764,502 B2
(45) Date of Patent: *Sep. 19, 2017

(54) APPARATUS AND PROCESS FOR PRODUCING POROUS DEVICES

(71) Applicant: Vertera, Inc., Atlanta, GA (US)

(72) Inventors: Wei-Hsiang Chang, Duluth, GA (US); Stephen Lee Laffoon, Atlanta, GA (US); Christopher S. D. Lee, Atlanta, GA (US)

(73) Assignee: VERTERA, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/348,323

(22) Filed: Nov. 10, 2016

(65) Prior Publication Data

US 2017/0057128 A1    Mar. 2, 2017

Related U.S. Application Data

(63) Continuation of application No. 14/985,226, filed on Dec. 30, 2015, now Pat. No. 9,498,922, which is a
(Continued)

(51) Int. Cl.
*B29C 43/04* (2006.01)
*B29C 44/58* (2006.01)
(Continued)

(52) U.S. Cl.
CPC .............. *B29C 43/04* (2013.01); *B29C 33/00* (2013.01); *B29C 44/58* (2013.01); *B29C 67/202* (2013.01);
(Continued)

(58) Field of Classification Search
CPC .............. B29C 67/202; B29K 2071/00; B29L 2031/7532
(Continued)

(56) References Cited

U.S. PATENT DOCUMENTS 699,026 A    4/1902    Shaler
3,059,275 A    10/1962    Vogt
(Continued)

FOREIGN PATENT DOCUMENTS

DE    10054089 C1    7/2002
DE    102006014174 A1    9/2007
(Continued)

OTHER PUBLICATIONS

International Search Report and Written Opinion for International Application No. PCT/US2009/047286 filed Jun. 12, 2009.
(Continued)

*Primary Examiner* — Nahida Sultana
(74) *Attorney, Agent, or Firm* — Morris, Manning & Martin, LLP; Bryan D. Stewart, Esq.

(57) ABSTRACT

In general, in various embodiments, the present disclosure is directed systems and methods for producing a porous surface from a solid piece of polymer. In particular, the present disclosure is directed to systems that include a track assembly, mold assembly, press assembly, and methods for using the same for producing a porous surface from a solid piece of polymer. In some embodiments, the present systems and methods are directed to processing a polymer at a temperature below a melting point of the polymer to produce a solid piece of polymer with an integrated a porous surface.

28 Claims, 16 Drawing Sheets

Related U.S. Application Data continuation-in-part of application No. 14/747,660, filed on Jun. 23, 2015, now Pat. No. 9,353,235, which is a continuation of application No. 14/587,856, filed on Dec. 31, 2014, now Pat. No. 9,085,665, said application No. 14/985,226 is a continuation-in-part of application No. 14/752,762, filed on Jun. 26, 2015, now Pat. No. 9,504,550, which is a continuation-in-part of application No. 14/587,856, filed on Dec. 31, 2014, now Pat. No. 9,085,665.

(60) Provisional application No. 62/017,834, filed on Jun. 26, 2014.

(51) Int. Cl.
| | | |
|---|---|---|
| *B29C 67/20* | (2006.01) | |
| *B29C 33/00* | (2006.01) | |
| *C08J 9/26* | (2006.01) | |
| B29K 71/00 | (2006.01) | |
| B29L 31/00 | (2006.01) | |

(52) U.S. Cl.
CPC ............. *C08J 9/26* (2013.01); *B29K 2071/00* (2013.01); *B29L 2031/753* (2013.01); *B29L 2031/7532* (2013.01); *C08J 2201/0446* (2013.01); *C08J 2205/05* (2013.01); *C08J 2300/22* (2013.01); *C08J 2371/00* (2013.01)

(58) Field of Classification Search
USPC ................. 425/383–384, 451, 453, 403.1
See application file for complete search history.

(56) References Cited

U.S. PATENT DOCUMENTS

| | | | |
|---|---|---|---|
| 3,445,553 A | 5/1969 | Hardigg | |
| 3,679,538 A | 7/1972 | Druin et al. | |
| 3,924,995 A | 12/1975 | Crooks et al. | |
| 3,947,212 A * | 3/1976 | Griner ...................... | A21B 1/46 425/451 |
| 4,043,733 A | 8/1977 | De Mets | |
| 4,164,794 A | 8/1979 | Spector et al. | |
| 4,351,069 A | 9/1982 | Ballintyn et al. | |
| 4,487,731 A | 12/1984 | Kobayashi | |
| 4,549,920 A | 10/1985 | Cogswell et al. | |
| 4,764,427 A | 8/1988 | Hara et al. | |
| 4,778,469 A | 10/1988 | Lin et al. | |
| 4,863,604 A | 9/1989 | Lo et al. | |
| 5,326,354 A | 7/1994 | Kwarteng | |
| 5,453,237 A * | 9/1995 | Padovani ................ | B29C 31/00 264/145 |
| 5,981,619 A | 11/1999 | Shikinami et al. | |
| 6,183,873 B1 | 2/2001 | Clarke | |
| 6,503,278 B1 | 1/2003 | Phjonen et al. | |
| 6,719,942 B1 * | 4/2004 | Triplett ............... | B29C 47/0828 264/209.4 |
| 7,819,650 B2 | 10/2010 | Meskendahl et al. | |
| 7,964,206 B2 | 6/2011 | Suokas et al. | |
| 9,345,817 B2 | 5/2016 | Papangelou et al. | |
| 9,498,922 B2 * | 11/2016 | Ha .......................... | B29C 43/04 |
| 2001/0015152 A1 * | 8/2001 | Dohr ........................ | B61D 7/20 105/282.3 |
| 2001/0020757 A1 * | 9/2001 | Fried ........................ | B29C 33/34 264/443 |
| 2003/0086973 A1 * | 5/2003 | Sowden .................... | A23G 3/04 424/474 |
| 2003/0138516 A1 | 7/2003 | Hess et al. | |
| 2004/0026811 A1 | 2/2004 | Murphy et al. | |
| 2004/0138058 A1 | 7/2004 | Sambasivan et al. | |
| 2005/0220932 A1 | 10/2005 | Van Der Eerden et al. | |
| 2005/0225008 A1 * | 10/2005 | Deardurff ............... | B29C 43/08 264/320 |
| 2005/0246021 A1 | 11/2005 | Ringeisen et al. | |
| 2007/0190962 A1 | 8/2007 | Sasaki et al. | |
| 2007/0191962 A1 | 8/2007 | Jones et al. | |
| 2007/0266542 A1 | 11/2007 | Melsheimer | |
| 2007/0275863 A1 | 11/2007 | Whitmarsh | |
| 2008/0185748 A1 | 8/2008 | Kalkanoglu | |
| 2008/0185752 A1 | 8/2008 | Cerwin et al. | |
| 2008/0208325 A1 | 8/2008 | Helmus et al. | |
| 2008/0211128 A1 * | 9/2008 | Lucier ................. | B29C 49/0047 264/101 |
| 2009/0104420 A1 | 4/2009 | Nadella et al. | |
| 2009/0222091 A1 | 9/2009 | Morrissette et al. | |
| 2010/0040902 A1 | 2/2010 | Mizrahi | |
| 2010/0151114 A1 | 6/2010 | Parrott | |
| 2010/0173036 A1 | 7/2010 | Haynes et al. | |
| 2010/0225033 A1 * | 9/2010 | Kwasniewski ......... | B29C 49/04 264/572 |
| 2010/0256804 A1 | 10/2010 | Freeman | |
| 2011/0022181 A1 | 1/2011 | Kasahara et al. | |
| 2011/0177320 A1 | 7/2011 | Mehrabi et al. | |
| 2011/0230970 A1 | 9/2011 | Lynn et al. | |
| 2011/0290674 A1 | 12/2011 | Shanley, IV | |
| 2012/0040037 A1 * | 2/2012 | Kwasniewski ......... | B29C 49/04 425/150 |
| 2012/0077010 A1 | 3/2012 | Manesis et al. | |
| 2012/0310137 A1 | 12/2012 | Silvestrini | |
| 2012/0323339 A1 | 12/2012 | Olade Graells et al. | |
| 2013/0119584 A1 | 5/2013 | Vantrease | |
| 2013/0164403 A1 | 6/2013 | Boogers et al. | |
| 2013/0211541 A1 | 8/2013 | Kerr et al. | |
| 2013/0236502 A1 | 9/2013 | Marshall et al. | |
| 2013/0282135 A1 | 10/2013 | Sun et al. | |
| 2013/0345827 A1 | 12/2013 | Wallick | |
| 2014/0102161 A1 * | 4/2014 | Stewart ................. | B21C 23/212 72/264 |
| 2014/0324213 A1 * | 10/2014 | Stewart ................. | B21C 23/085 700/196 |
| 2014/0346716 A1 * | 11/2014 | Zhang ..................... | B29C 49/20 264/523 |
| 2015/0066152 A1 | 3/2015 | Slocum, Jr. et al. | |
| 2015/0373381 A1 | 12/2015 | Rouhana, Jr. | |
| 2016/0166301 A1 | 6/2016 | Papangelou et al. | |
| 2016/0361837 A1 * | 12/2016 | Hayes .................. | B29B 13/023 |

FOREIGN PATENT DOCUMENTS

| | | |
|---|---|---|
| EP | 0512401 A2 | 11/1992 |
| EP | 0714869 A2 | 6/1996 |
| EP | 1162047 A1 | 12/2001 |
| FR | 1171658 A | 1/1959 |
| GB | 829811 A | 3/1960 |
| WO | 9964361 A1 | 12/1999 |
| WO | 02068373 A2 | 9/2002 |
| WO | 03024626 A1 | 3/2003 |
| WO | 03074227 A2 | 9/2003 |
| WO | 03080119 A1 | 10/2003 |
| WO | 2004020362 A1 | 3/2004 |
| WO | 2004082333 A1 | 9/2004 |
| WO | 2007090131 A1 | 8/2007 |

OTHER PUBLICATIONS

International Preliminary Search Report on Patentability for International Application No. PCT/US2009/047286 filed Jun. 12, 2009.
International Search Report and Written Opinion for International Application No. PCT/US2013/055656 filed Aug. 20, 2013.
International Search Report and Written Opinion for International Application No. PCT/US2013/055655 filed Aug. 20, 2013.
International Search Report and Written Opinion mailed Sep. 23, 2015 for International Application No. PCT/US2015/038181.
FortiCore® Cervical—Nanovis Inc. Retrieved Mar. 10, 2016, from http://www.nanovisinc.com/forticore-cervical/.

* cited by examiner

APPARATUS AND PROCESS FOR PRODUCING POROUS DEVICES

CROSS REFERENCE TO RELATED APPLICATIONS

This Application is a continuation of U.S. patent application Ser. No. 14/985,226, filed Dec. 30, 2015, entitled "APPARATUS AND PROCESS FOR PRODUCING POROUS DEVICES", by Wei-Hsiang Chang, et al, which is incorporated herein by reference in its entirety and is a continuation-in-part application and claims the benefit of and priority under 35 U.S.C. §120 to:

U.S. patent application Ser. No. 14/747,660, filed Jun. 23, 2015, entitled "Medical Device with Porous Surface and Method for Producing Same", by Wei-Hsiang Chang, et al, now U.S. Pat. No. 9,353,235, which is a continuation of U.S. patent application Ser. No. 14/587,856, filed Dec. 31, 2014, entitled "Method for Producing Porous Material", by Wei-Hsiang Chang, et al., now U.S. Pat. No. 9,085,665, each of which are hereby incorporated by reference herein as if set forth herein in their entireties; and U.S. patent application Ser. No. 14/752,762, filed Jun. 26, 2015, entitled "Porous Devices and Processes for Producing Same", by Wei-Hsiang Chang, et al, pending, which is a continuation-in-part application of U.S. patent application Ser. No. 14/587,856, filed Dec. 31, 2014, entitled "Method for Producing Porous Material", by Wei-Hsiang Chang, et al., now U.S. Pat. No. 9,085,665 and claims the benefit of and priority to U.S. Provisional Patent Application No. 62/017,834, filed Jun. 26, 2014, entitled "Polymer Layer with Increased Wettability", each of which are hereby incorporated by reference herein as if set forth herein in their entireties.

TECHNICAL FIELD

The present disclosure relates generally to apparatuses and processes for creating porous devices.

BACKGROUND

Polymers have been shown to have many advantageous mechanical and chemical properties such as imperviousness to water, low toxicity, chemical and heat resistance, and shape-memory properties. Additionally, polymers are often relatively low cost, easy to manufacture, and versatile in application. These characteristics have led to the use of polymers in many applications such as, for example, medical devices, electronics, optics, computing, and a wide-array of consumer products.

Adding pores to one or more surfaces of a polymer structure may provide further advantages, such as, for example, increasing friction at the one or more porous surfaces and providing better device integration in surgical applications by promoting adjacent tissue in-growth. However, as will be understood by one of ordinary skill in the art, introducing porosity into polymers may, in some instances, weaken desired mechanical properties, such as shear strength at the porous surface. Thus, although introducing pores into such polymers may have certain advantages, it has been limited in application due to a loss in mechanical properties.

BRIEF SUMMARY OF THE DISCLOSURE

One aspect of the present disclosure generally relates to producing a porous surface from a solid piece of polymer. In particular, producing a porous surface from a solid piece of polymer at a processing temperature below a melting point of the polymer to produce a solid piece of polymer with a porous surface integrated into the solid piece of polymer.

According to particular aspects, a method including: 1) loading a solid body of material and porogen into a mold that is configured to travel along a predetermined path; 2) applying pressure via a press to the solid body of material for displacing the porogen through the surface by a defined distance, creating, thereby, a matrix layer including the material and the porogen in the solid body of material, the matrix layer being integrally connected with the solid body of material; 3) maintaining, via a heating element located along the predetermined path, throughout the heating and displacing steps, a temperature of the surface of the solid body that is below the melting temperature by at least the melting temperature differential; and 4) unloading the solid body of material from the mold and removing the porogen to create an integrally connected porous layer in the solid body of material.

According to at least one aspect, a method for processing material, the method comprising: 1) providing a piece of polymer for processing; 2) pressing a surface of the piece of polymer against a layer of porogen via a static weight; 3) while the piece of polymer is pressed against the layer of porogen, subjecting the piece of polymer to at least one heat zone along a track assembly, wherein the at least one heat zone heats the material to a particular temperature for a particular time; 4) further pressing the piece of polymer against the layer of porogen via a press assembly such that at least a portion of the layer of porogen is displaced through a surface of the piece of polymer to create a matrix layer of porogen and the polymer; and 5) removing the porogen from the matrix layer of the polymer thereby creating a porous layer of the polymer.

According to some aspects, a method comprising: 1) loading a solid body of material and porogen into a mold; 2) heating, via a heating element located along a processing path, a surface of the solid body of material to a processing temperature that is below a melting temperature of the material by a melting temperature differential; 3) increasing heat from the processing temperature while applying a constant pressure to the solid body of material for displacing the porogen through the surface by a defined distance, creating, thereby, a matrix layer including the material and the porogen in the solid body of material, the matrix layer being integrally connected with the solid body of material; 4) maintaining throughout the heating and displacing steps, the constant pressure on the solid body of material; 5) cooling the solid body of material once the porogen is displaced through the surface by a defined distance; and 6) unloading the solid body of material from the mold and removing the porogen to create an integrally connected porous layer in the solid body of material.

According to one or more aspects, a method for processing material, the method comprising: 1) providing a thermoplastic for processing; 2) providing a porogen for creating a porous layer in the thermoplastic; 3) providing a track assembly comprising at least one heating element for heating the thermoplastic; 4) providing a static weight for applying a constant pressure to the thermoplastic; 5) providing a press assembly for applying an increased pressure to the thermoplastic; 6) loading the porogen and thermoplastic onto the track assembly, wherein a surface of the thermoplastic is in contact with the porogen; 7) applying the constant pressure to the thermoplastic via the static weight and applying heat to the thermoplastic via the heating element; 8) applying the increased pressure to the thermoplastic via the press assembly for displacing the porogen through the surface of the thermoplastic; 9) removing the increased pressure and heat from the thermoplastic to allow the thermoplastic to cool; 10) removing the constant pressure from the thermoplastic; and 11) removing the porogen from the thermoplastic, thereby creating a porous layer of the thermoplastic integrally formed within a surface of the thermoplastic.

In various embodiments, an apparatus for processing a material, the apparatus comprising: 1) a work bench assembly; 2) a mold assembly, the mold assembly comprising: a) an outer mold body defining an opening for receiving a mold insert; b) the mold insert comprising a void for receiving a layer of porogen and a piece of thermoplastic material; and c) a static weight for applying pressure to the a piece of thermoplastic material; 3) a track assembly operatively connected to the work bench assembly, the track assembly comprising: a) a frame; b) at least one track guide operatively connected to the frame, the at least one track guide defining a path of travel for the mold assembly; c) two or more electrical resistance heating elements located under the at least one track guide, wherein the two or more electrical resistance heating elements heat the mold assembly to at least one predetermined processing temperature; and d) one or more indexers for moving the mold assembly along the path of travel; and 4) a press operatively connected to the work bench assembly, the press assembly for applying pressure the piece of the thermoplastic material, wherein the pressure applied by the press is in addition to the pressure applied by the static weight.

In particular embodiments, an apparatus for processing a material, the apparatus comprising: 1) a mold, the mold configured to receive a porogen and a piece of material for processing; 2) a track for guiding the mold along a predefined processing path; 3) a heating element at a first particular portion of the processing path for heating the material; and 4) a press for applying force to the material at a second particular portion of the processing path.

In at least one embodiment, an apparatus for producing a porous material, the apparatus comprising four (4) sections, wherein: 1) a first section of the apparatus comprises an area for loading a solid piece of material and porogen into a mold; 2) a second section of the apparatus comprises a first heating element for heating the solid piece of material to a particular processing temperature; 3) a third section of the apparatus comprises a second heating element for holding the processing temperature; and 4) a further section of the apparatus comprises a press for applying pressure to the piece of material for causing the porogen to displace within a surface of the piece of material.

In some embodiments, an apparatus for producing a porous material, the apparatus comprising: 1) a means for receiving a particular piece of material and at least one layer of porogen; 2) a means for pressing the particular piece of material against the at least one layer of porogen; and 3) a means for guiding the particular piece of material along a predefined path, wherein the predefined path includes: a) a means for heating the particular piece of material to a particular processing temperature; and b) a means for applying pressure to the particular piece of material to displace at least some of the at least one layer of porogen into the particular piece of material.

These and other aspects, features, and benefits of the claimed systems and methods will become apparent from the following detailed written description of the preferred embodiments and aspects taken in conjunction with the following drawings, although variations and modifications thereto may be effected without departing from the spirit and scope of the novel concepts of the disclosure.

DETAILED DESCRIPTION

Figure 1:
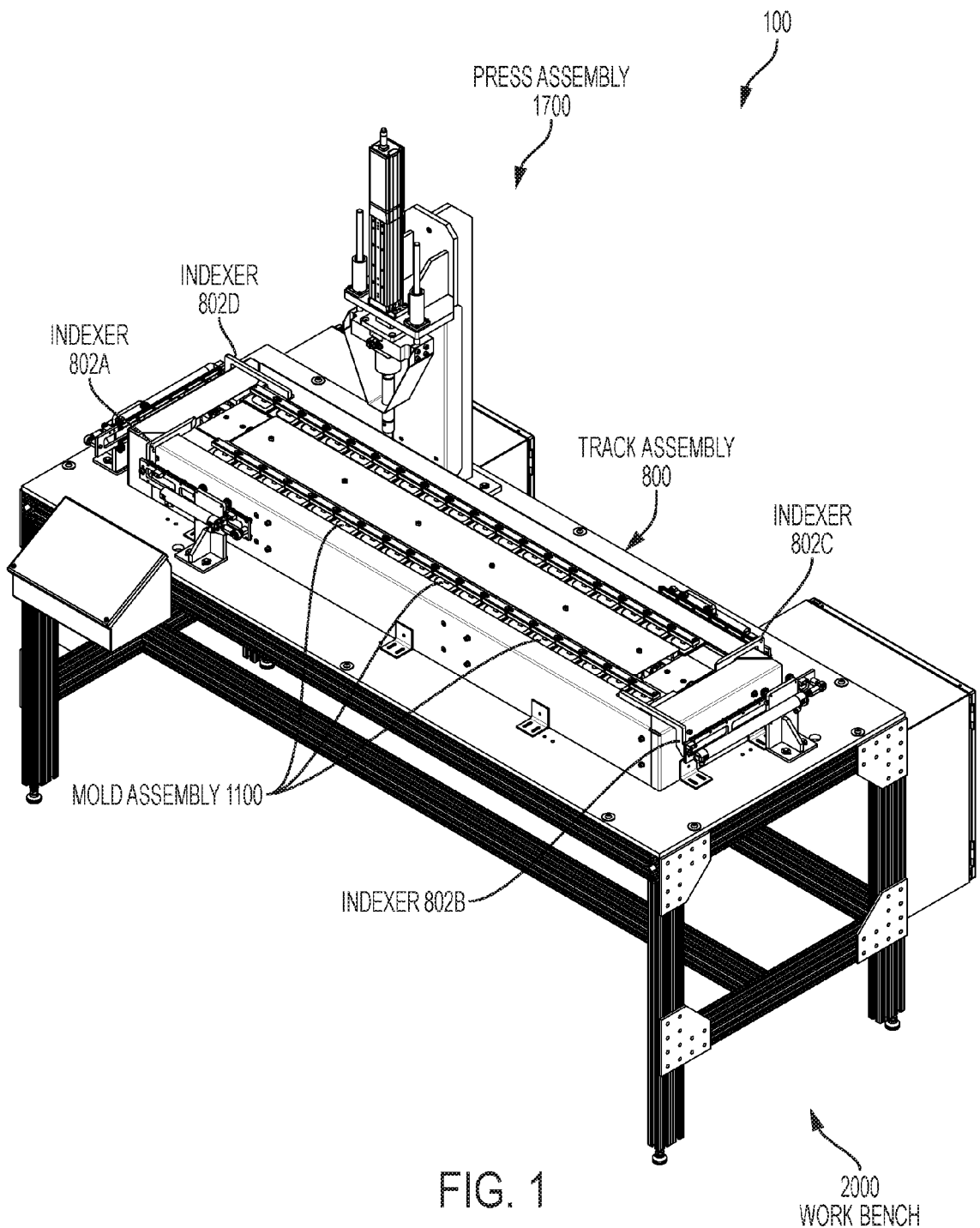
FIG. 1 shows an exemplary apparatus for producing porous devices according to one aspect of the present disclosure.

This application is related to and incorporates by reference herein the following U.S. patent applications:

U.S. patent application Ser. No. 12/997,343, entitled "Material and Method for Producing the Same," filed on Jun. 12, 2009;

U.S. patent application Ser. No. 13/935,478, entitled "Porous Polymer Layer and Methods of Manufacture," filed Jul. 3, 2013;

U.S. patent application Ser. No. 14/747,660, entitled "Medical Device with Porous Surface and Method for Producing Same," filed Jun. 23, 2015;

U.S. patent application Ser. No. 14/587,856, entitled "Method for Producing Porous Material," filed Dec. 31, 2014, now U.S. Pat. No. 9,085,665; and U.S. patent application Ser. No. 14/752,762, entitled "Porous Devices and Processes for Producing Same," filed Jun. 26, 2015.

Any incorporation by reference is not intended to give a definitive or limiting meaning of a particular term. In the case of a conflict of terms, this document governs.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Overview

According to particular embodiments, the systems and methods herein are directed to an apparatus and process for producing porous materials. Prior to delving into the specific details of the apparatus, a brief and non-limiting explanation of an exemplary process of producing porous material may assist with understanding the processes set forth herein. In particular embodiments, an exemplary process for producing porous materials includes: 1) heating a surface of a solid piece of polymer to a processing temperature below a melting point of the polymer; 2) holding the processing temperature while displacing a porogen layer through the surface of the polymer to create a matrix layer of the solid polymer body comprising the polymer and the porogen layer; and 3) removing at least a portion of the porogen layer from polymer. In one or more embodiments, the processing temperature is approximately one (1) to 38 degrees below a melting point of a polymer. As will be understood by one of ordinary skill in the art, different polymers may have different melting temperatures and some polymers may exhibit melting properties at more than one temperature.

This exemplary process results in interfacial shear strength between the porous layer and solid polymer body that increases with longer processing times that are above a predetermined processing temperature (Tp), but below a melting point of the polymer. Further, pressure applied to exert polymer flow of polyetheretherketone (PEEK) at a constant rate is significantly correlated statistically (i.e., p-value less than 0.05 as calculated by linear regression analysis) with processing time above a defined processing temperature of 330 degrees Celsius for up to 30 to 45 minutes. This correlation is counter to expected results and indicates that polymer flow viscosity increases with increased processing time below PEEK's melting point of 343 degrees Celsius (e.g., increased processing time at about one to 13 degrees below 343 degrees Celsius, or between about 330 and 342 degrees Celsius).

As will be understood by one of ordinary skill in the art, "polymer flow" or "polymer flow viscosity", as used herein may refer to any flow of a particular polymer and may not necessarily mean flow of a polymer above a melting point of the particular polymer. In specific embodiments, "polymer flow" and "polymer flow viscosity" refer to flow of a polymer below a melting point of the polymer. Alternately, polymer flow or polymer flow viscosity may be referred to as "polymer resistance to displacement" or the like.

As will be understood by one of ordinary skill in the art, any suitable materials may be used in the above process. In at least one embodiment, the polymer in the above exemplary process is polyetheretherketone (PEEK). In one or more embodiments, the porogen in the above exemplary process is sodium chloride grains arranged in one or more layers, such that when the polymer is heated it at least partially flows between the gaps of the layers of the sodium chloride particles.

The above exemplary process is further discussed in U.S. patent application Ser. No. 14/747,660, entitled "Medical Device with Porous Surface and Method for Producing Same," filed Jun. 23, 2015, which is incorporated herein by reference in its entirety.

This exemplary process may be substantially conducted in whole or in part by the systems and methods discussed herein. In particular embodiments, an exemplary processing system (apparatus) includes: 1) one or more molds for holding a piece of material for processing; 2) a guide path or track mechanism for guiding the one or more molds along a predefined path; 3) at least one heating element for heating the one or more molds to a particular temperature (or temperature range) along the predefined path; and 4) a press for applying pressure to the one or more molds to displace porogen through a surface of the piece of material.

The apparatuses and processes above will be discussed in more detail below and in reference to the figures. In particular, an exemplary process for creating a porous device will be described below. Following this discussion of the exemplary process, an exemplary apparatus for conducting the exemplary process will be discussed.

Exemplary Process

As will be further discussed, the systems and methods herein are directed to a system and process for producing porous materials. FIG. 1 provides a brief overview of an exemplary system for processing a piece of material (e.g., thermoplastic) to include a porous layer. FIGS. 2-7 depict the exemplary system of FIG. 1 as an exemplary mold assembly (e.g., of the one or more mold assemblies 1100 shown in FIG. 1) proceeds through the exemplary process.

Turning to FIG. 1, an exemplary processing machine 100 is shown. In the embodiment shown, the exemplary processing machine includes a track assembly 800, one or more mold assemblies 1100, a press assembly 1700, and a work bench assembly 2000. As will further be discussed herein, the track assembly 800, in this embodiment, includes one or more indexers 802 for moving the one or more mold assemblies 1100 along a pre-defined path and one or more heating elements (in this embodiment, the one or more heating elements are located below the surface of the track assembly 800 and are not shown in FIG. 1) for heating the one or more mold assemblies 1100. As will also be further discussed herein, the one or more mold assemblies may each include a mold, an insert (for holding a piece of material and porogen), and a static weight for applying pressure to the piece of material.

FIGS. 2-7 depict an exemplary process for producing a porous material via the system shown in FIG. 1. In the embodiment shown, a particular mold assembly 1100A of the one or more mold assemblies 1100 is shown in different locations on the track assembly 800 as it moves through the exemplary process. In various embodiments, the track assembly 800 is divided into a number of processing "zones." As will be discussed herein, each "zone" indicates an area where a particular processing step occurs and may generally be divided by thermal insulators or conductors (e.g., each zone has a particular heat element or temperature associated with it). As will be understood from discussions herein, the zones shown are exemplary and in various embodiments, each zone may vary by length or may include different processing steps and the number of zones included in a particular track assembly may vary. In further embodiments, the track assembly 800 may not be easily be broken into "zones" because processing steps overlap, because thermal insulators or conductors are not present, or for other reasons.

In the embodiment shown, the particular mold assembly 1100A begins in zone 1 804, then is moved (or indexed) to zone 2 806, then to zone 3 808, and to zone 4 810.

Figure 2:
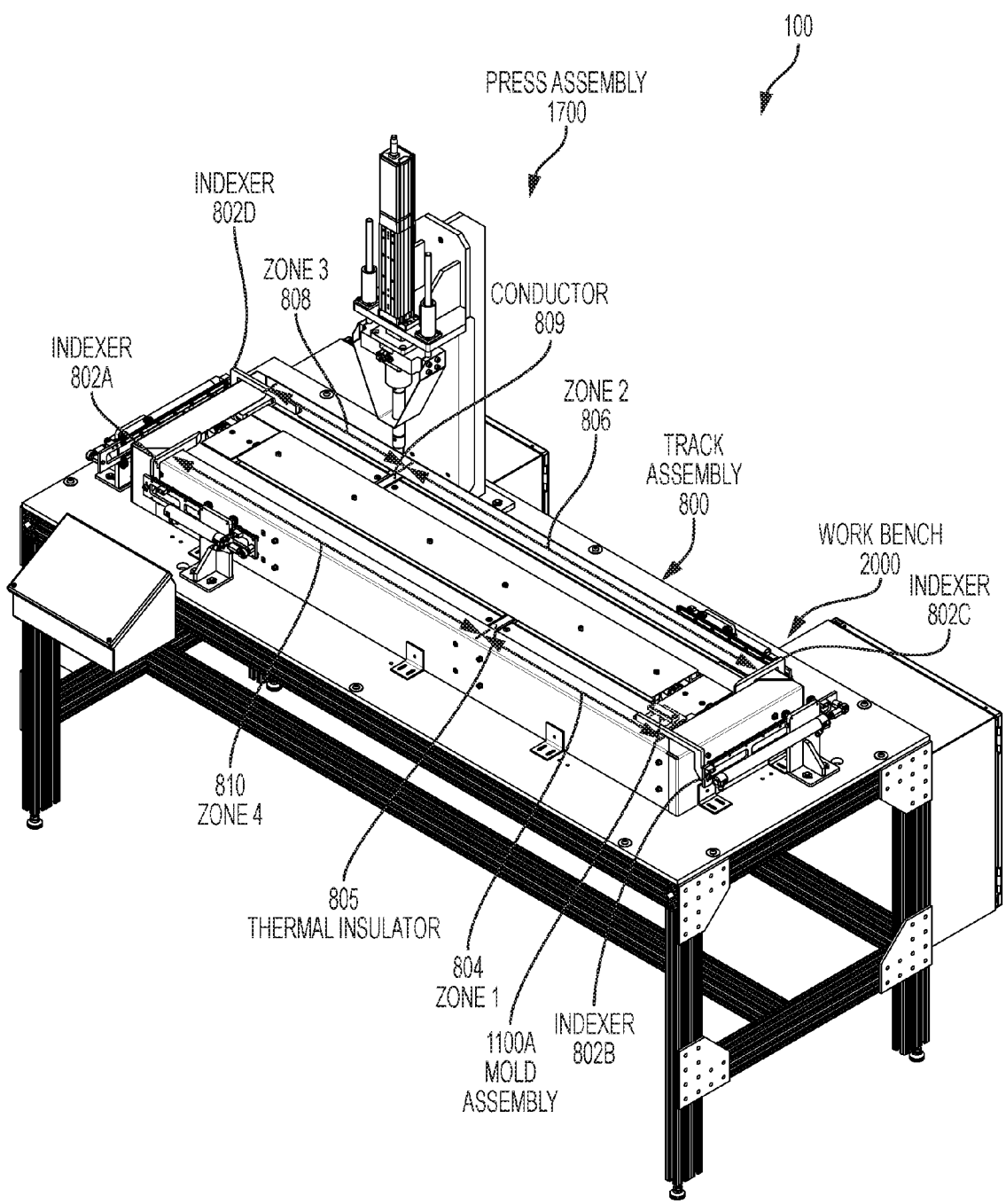
FIG. 2 shows the exemplary apparatus of FIG. 1, with a mold in a first exemplary position according to one embodiment of the present disclosure.
Figure 7:
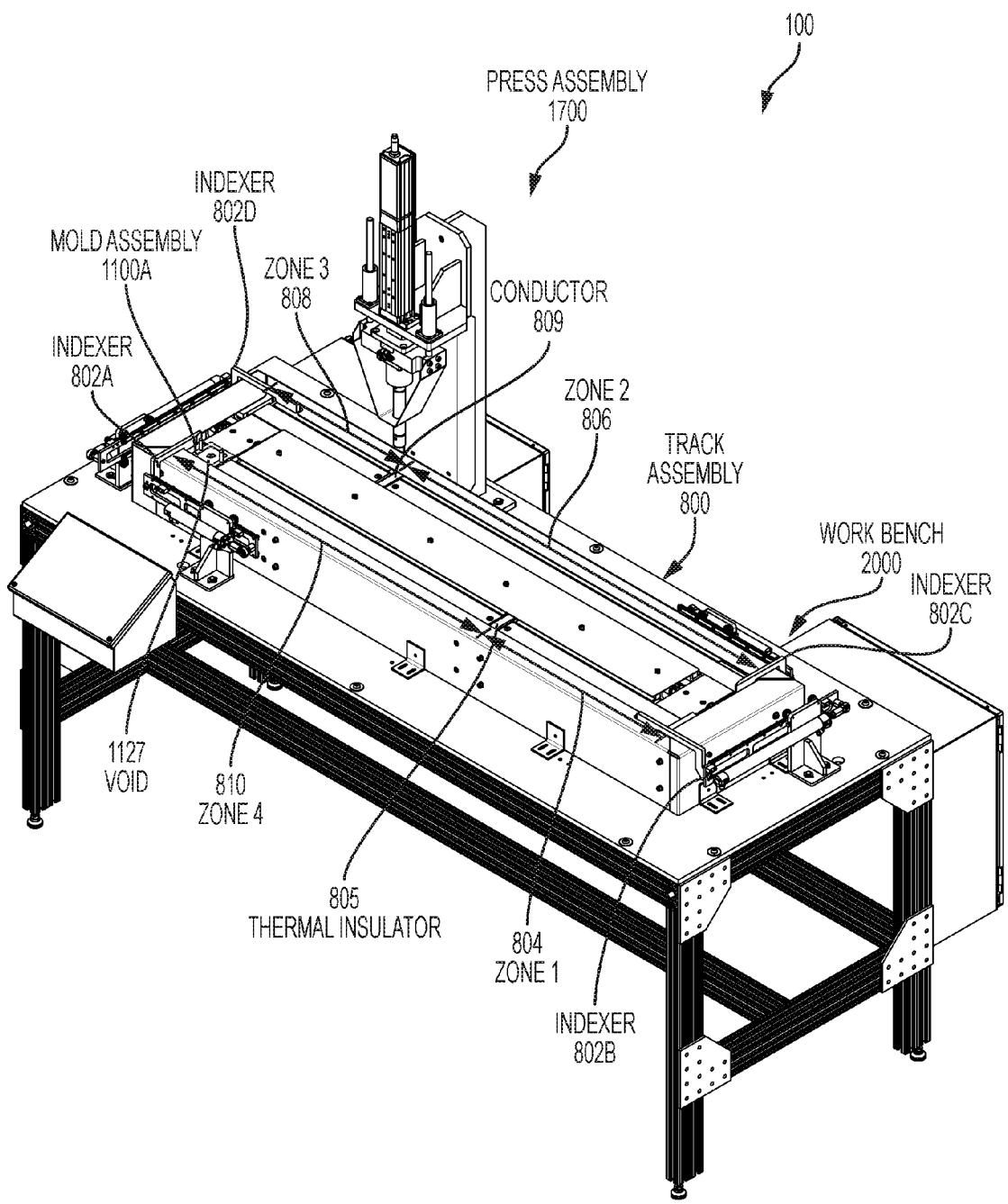
FIG. 7 shows the exemplary apparatus of FIG. 1, with a mold in a fifth exemplary position according to one embodiment of the present disclosure.

Further, in the embodiment shown, the mold assembly 1100A is shown moving from the front right side of the track assembly 800 in FIG. 2 to the front left side of the track assembly 800 in FIG. 7. As will be understood from discussions herein, this particular path is exemplary and an exemplary mold assembly (or a different type of assembly, mold, or piece) could move along track assembly 800 in a different pattern (e.g., in a reverse order, etc.).

Turning to FIG. 2, an exemplary mold assembly 1100A is shown at the front right of the exemplary track assembly 800 in zone 1 804. In various embodiments, zone 1 804 is an area along track assembly 800 for loading material, porogen, and inserts into molds and for placing a static weight onto the material (e.g., to press a surface of the material onto the porogen). In particular embodiments, zone 1 804 is defined as an area from a thermal insulator 805 to a front right corner of the track assembly 800 (e.g., against indexer 802B). In some embodiments, zone 1 804 may be longer or shorter than as shown in FIG. 2. As a particular example, the first thermal insulator 805 may be in an alternate location, such as closer to the indexer 802A. Thus, in this example, zone 1 804 may extend from the first thermal insulator 805 at this alternate location.

As a second particular example, the track assembly 800 may not include thermal insulator. In this second particular example, zone 1 804 may extend from the indexer 802B along the track to the left (in the orientation shown in FIG. 2) for a predefined distance (e.g., several centimeters, a meter, several meters, etc.). Alternately, zone 1 804, in this second particular example, may extend from the indexer 802B for an undefined distance or for a distance defined by the length of a single mold (e.g., the mold 1100A). Further, in embodiments where the track assembly 800 does not include the thermal insulator and also does not include indexers (e.g., the system includes another mechanism for moving a mold, as discussed below), zone 1 804 may be a predefined distance from another reference point on the track assembly 800 and/or may be defined by a particular temperature associated with this zone.

In the embodiment shown in FIG. 2, the mold assembly 1100A includes a mold, an insert, and a static weight (each of which will be discussed regarding FIGS. 11-16, below). In this embodiment (and others), the insert of the mold assembly 1100A includes a void 1127 for defining a particular shape of material. In the embodiment shown, the void 1127 is defined such that it receives a predetermined amount of porogen and a piece of material in the particular shape for processing.

Figure 13:
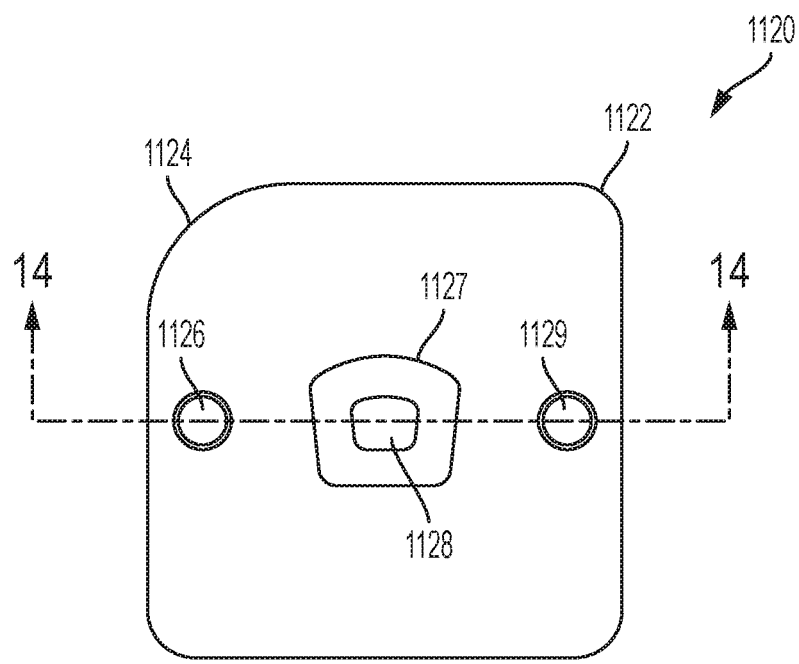
FIG. 13 shows a top view of an exemplary insert according to one embodiment of the present disclosure.
Figure 14:
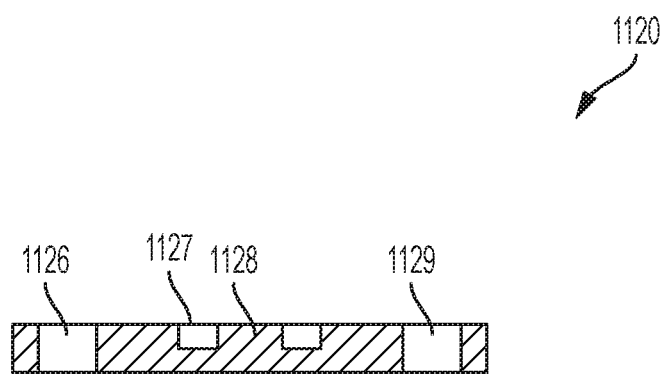
FIG. 14 shows a cross-section of the exemplary insert of FIG. 13 according to one embodiment of the present disclosure.

Continuing with FIG. 2, in zone 1 804, the mold assembly 1100A includes a void 1127 for receiving a predetermined amount of porogen (the void 1127 is shown in FIGS. 13 and 14). The void 1127 may receive the porogen from any suitable source, including, for example, an operator (e.g., a human places a predetermined amount of porogen in the void) or a porogen dispenser (e.g., a dispenser automatically dispenses porogen into the void 1127 based on some sensor input, such as detecting that the void 1127 has moved into position below a dispensing end of the porogen dispenser).

As discussed herein, the porogen may be any suitable material. In particular embodiments, the porogen includes sodium chloride crystals (e.g., salt). In some embodiments, the porogen is another ionic solid that can be displaced within a polymer/thermoplastic and then removed. In further embodiments, the porogen includes particles of one or more particular materials such as other salts, sugars, polymers, metals, etc.

The predefined amount of porogen may be any suitable amount for creating a porous surface of the material being processed. In particular embodiments, the predefined amount of porogen is an amount of porogen to cover a bottom surface of the void 1127. In some embodiments, the predefined amount of porogen is packed irregular grains covering a bottom surface of the void 1127 to a depth of approximately 0.2 mm to 2.0 mm.

Once the porogen is received by the void 1127, the void 1127 receives a piece of material in the particular shape (e.g., on top of the porogen). In one or more embodiments, the void 1127 receives the piece of material from an operator (e.g., a human may place the piece of material on the porogen in the void). In some embodiments, the void 1127 receives the piece of material from a robot or material placing device or system.

As will be understood from discussions herein and from the materials incorporated herein by reference, the piece of material may be any suitable polymer and may, in particular embodiments, be any suitable thermoplastic (such as PEEK or carbon-reinforced PEEK, a material that is at least 50% PEEK by weight, and/or another suitable thermoplastic, etc.).

After the piece of material is placed on the porogen, a static weight is placed on top of the piece of material to press a surface of the piece of material onto the porogen.

In particular embodiments, the static weight is placed on the material by aligning the holes of the static weight with the pegs of the mold and sliding the static weight onto the pegs (via the holes). In various embodiments, the static weight may be placed on the piece of material by a human operator or a robot. The static weight will be further discussed below in regards to FIGS. 15 and 16.

According to particular embodiments, the static weight is such that the weight applies a pressure to the material of 0.1 to 10 PSI. In various embodiments, the static weight is such that the weight applies a pressure of about 0.1 to 2.0 PSI.

The process above may vary. In particular embodiments, the porogen and piece of material may be loaded into the insert prior to the insert being placed in the mold. In these embodiments, the porogen and/or the piece of material is loaded into the insert, then the insert is loaded into the mold in zone 1 804. In some embodiments, the insert may include pegs, opposed to the mold. In these embodiments, the porogen and piece of material may be loaded into the insert and the static weight may be loaded onto the piece of material (e.g., via pegs on the insert, in this embodiment) prior to the insert being placed in the mold at zone 1 804.

Figure 3:
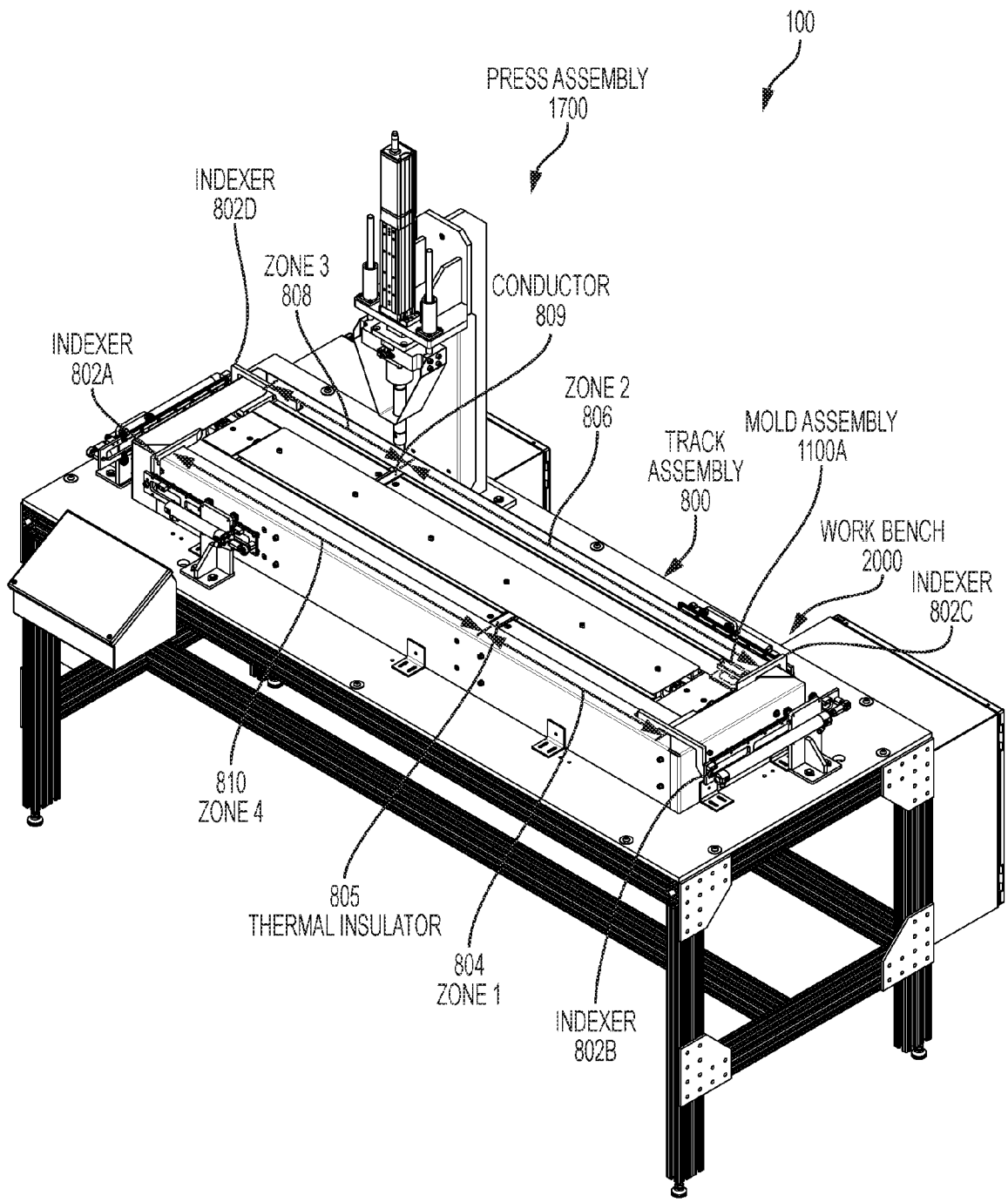
FIG. 3 shows the exemplary apparatus of FIG. 1, with a mold in a second exemplary position according to one embodiment of the present disclosure.

After a predetermined amount of time or after a particular event, the indexer 802B moves (indexes) the mold assembly 1100A to zone 2 806, the position shown in FIG. 3. As will be further discussed herein, the indexer 802B may move the mold assembly 1100A in any suitable way. As shown in FIG. 2, the indexer 802B is a substantially flat arm that is connected to a hydraulic cylinder. In this embodiment, the indexer 802B pushes the mold assembly 1100A to zone 2 806. In alternate embodiments (discussed below), the indexer 802B may move the mold assembly 1100A to zone 2 806 through another mechanism (e.g., a motor, a solenoid, a cam, etc.)

As will be understood from discussions herein, in various embodiments, indexer 802B may index mold assembly 1100A a distance equal to a length of the one or more mold assemblies 1100 (e.g., when the one or more mold assemblies 1100 substantially fill the track assembly 800 and are substantially touching as shown in FIG. 1). In these embodiments, the mold assembly 1100A will be indexed more than once before reaching the position shown in FIG. 3. In some embodiments, the system is configured to index mold assembly 1100A a distance other than the length of the one or more assemblies 1100. In these embodiments, the system may be configured to index the mold assembly any suitable distance down the track assembly 800 (e.g., half the length of the front portion of the track assembly 800, a quarter of a length of the track assembly 800, etc.).

Turning to FIG. 3, mold assembly 1100A is shown in zone 2 806. As discussed above, in the embodiment shown, zone 2 806 extends from an interior wall of the track assembly 800 (e.g., in front of the indexer 802C) to the conductor 809.

Zone 2 806 as shown in FIG. 3, includes one or more heating elements under the surface of the track assembly 800 for heating the mold assembly 1100A to a predetermined temperature. In various embodiments, the track assembly 800 further includes various sensors (not shown) for measuring the approximate temperature of the mold assembly 1100A.

The predetermined temperature may be any suitable temperature. In various embodiments, as discussed in the patents and patent applications incorporated herein by reference, the predetermined temperature is a temperature that is below a melting point of the piece of material. For example, as discussed herein, a particular polymer, PEEK, exhibits melting temperatures at approximately 240 and 343 degrees Celsius. Thus, the predetermined temperature is approximately one to thirty-eight degrees below a melting point of the piece of material. In the example where the piece of material is PEEK, the predetermined temperature is approximately 305 to 342 degrees Celsius. As will be understood from discussions herein, the temperature of the one or more heating elements may be greater than the temperature of the piece of material (e.g., some heat from the one or more heating elements is lost through heat transfer).

Figure 4:
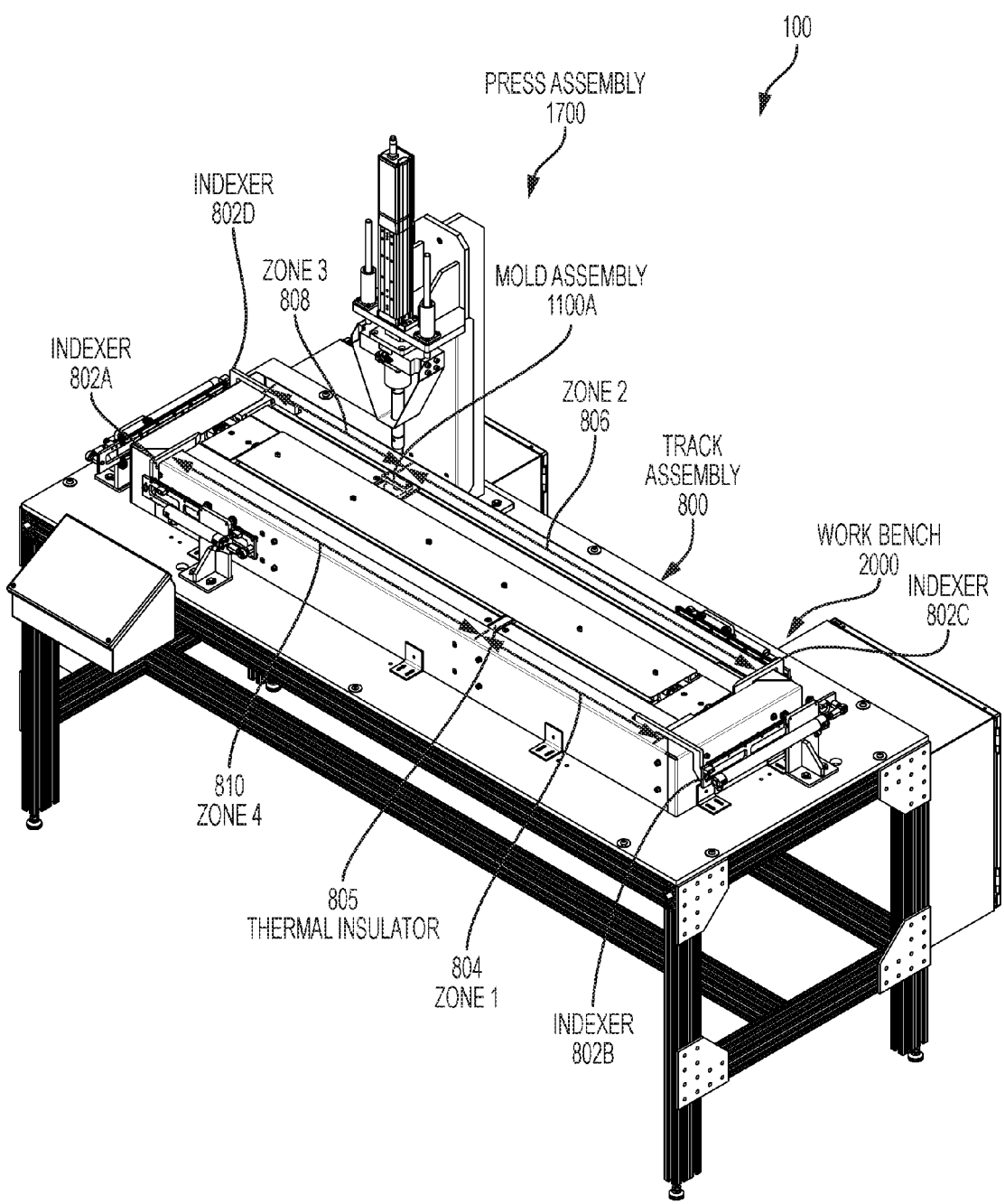
FIG. 4 shows the exemplary apparatus of FIG. 1, with a mold in a third exemplary position according to one embodiment of the present disclosure.

At a particular point in time or after a predetermined event, the system moves the mold assembly 1100A from zone 2 806 to under the press assembly 1700 (via the indexer 802C), as shown in FIG. 4.

As shown in FIG. 4, the press assembly 1700 is located just before the conductor 809 (e.g., in zone 2 806). Thus, as will be understood from discussions herein, the press assembly 1700 acts on the piece of material and the mold assembly 1100A while the one or more heating elements of zone 2 806 are supplying heat (or holding a predetermined temperature) to the piece of material and mold assembly 1100A. In further embodiments, not shown, the press assembly 1700 may be located outside of zone 2 806 or, in some embodiments, located in an area where no heat is being applied to the piece of material and/or the mold assembly 1100A (e.g., the system, in a particular embodiment, is set up such that the piece of material is heated to a predetermined temperature by a heat source, then moved away from the heat source to under the press assembly 1700).

Figure 5:
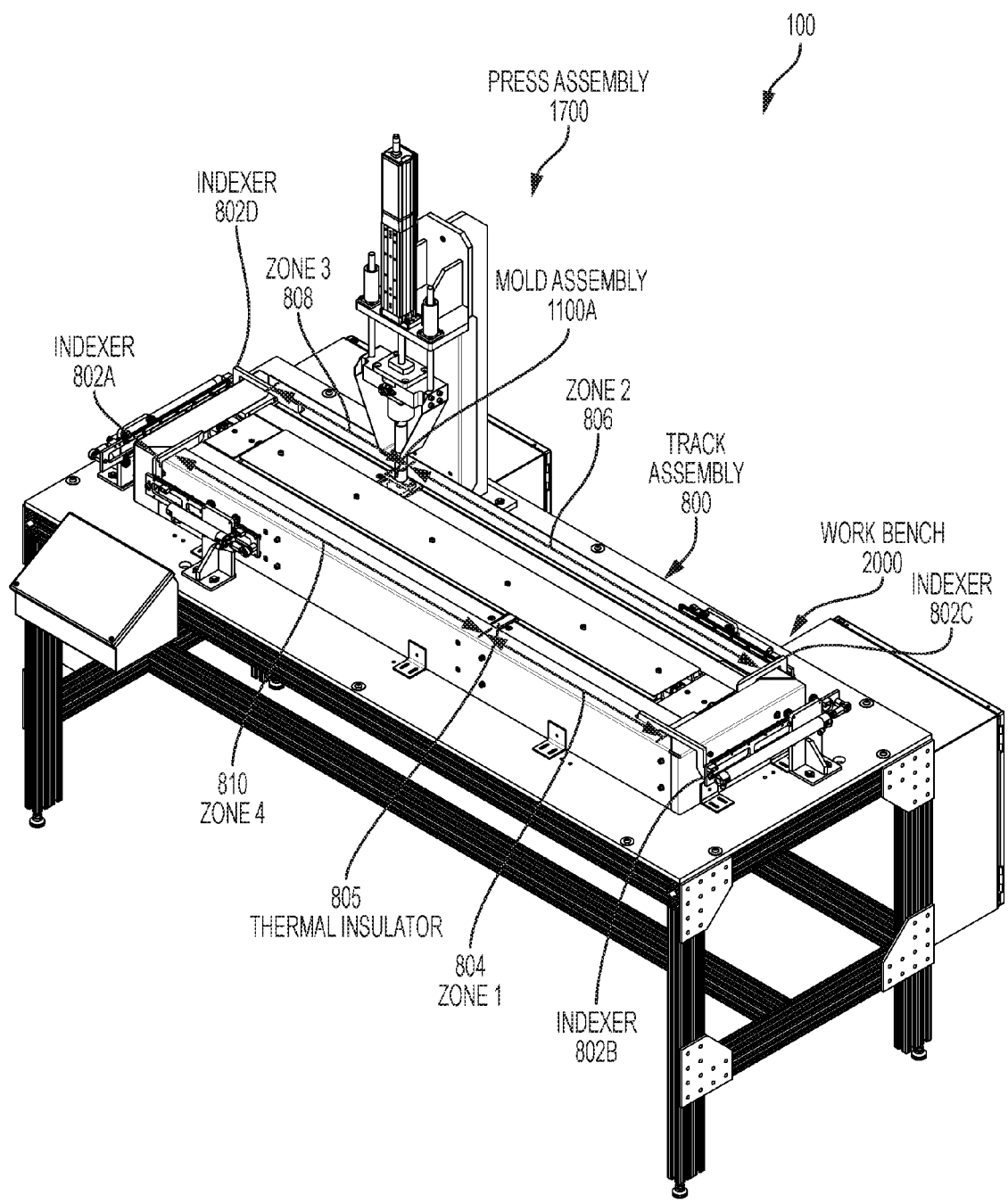
FIG. 5 shows the exemplary apparatus of FIG. 1, with a mold in a fourth exemplary position according to one embodiment of the present disclosure.

As shown in FIG. 5, the press assembly 1700, moves from a first position (e.g., at rest, above the track assembly 800) to a second position in contact with the mold assembly 1100A (e.g., in contact with the static weight) and applies pressure to the mold assembly 1700. This pressure is additional to the pressure applied by the static weight, which, in various embodiments is about 0.1 to 10 PSI.

The additional pressure added by the press assembly 1700 may be any suitable pressure. In particular embodiments, the additional pressure added by the press assembly 1700 is up to 250 PSI. In one or more embodiments, the additional pressure added by the press assembly 1700 is between 50 and 250 PSI. In at least one embodiment, the additional pressure added by the press assembly 1700 is about 150 PSI.

As will be understood from discussions herein, in various embodiments, the additional pressure is applied to the piece of material (via the static weight) such that the porogen is displaced through the surface of the piece of material to any suitable depth. In a particular embodiment, the porogen is displaced through the surface of the piece of material to a depth of approximately 0.2 mm to 2.0 mm.

The system may be configured to apply pressure from the press assembly 1700 to the piece of material for any suitable duration of time or until a particular event occurs. In various embodiments, the duration of time (that the press assembly 1700 applies pressure the piece of material and/or mold assembly), is predetermined and ranges from one to forty-five minutes. As will be understood from discussions herein, the system may include a timer or other sensor, such that the press assembly 1700 automatically applies pressure to the piece of material until the timer "times out" or indicates that a duration of time as ended.

According to particular embodiments, the system includes a displacement sensor coupled to the press assembly 1700. In these embodiments, the system is configured to determine when the piece of material has moved a predetermined distance (e.g., when the porogen has displaced through the surface of the piece of material to a particular depth (e.g., 0.2 to 2.0 mm). In at least one embodiment, the system includes a load cell within the press assembly 1700 such that the press ram is moved to a particular position (e.g., pressing a surface of a piece of material against the porogen) until the load cell no longer measures force being applied to the piece of material, indicating that the ram is at the particular position and is not exerting pressure on the mold assembly and thus that the porogen has displaced within the surface of the material.

In at least one embodiment, the system is configured to index and/or move each of the one or more mold assemblies based on the timing of the press assembly 1700. In these embodiments, the system is configured to index a particular mold assembly of the one or more mold assemblies to the next zone or to a next location upon a timer for the press assembly 1700 timing out or when a displacement or load cell sensor indicates that the piece of material has moved downward by a particular distance (e.g., indicating that the porogen has displaced within a surface of the piece of material by the particular distance, such as 0.2 to 2.0 mm).

Figure 6:
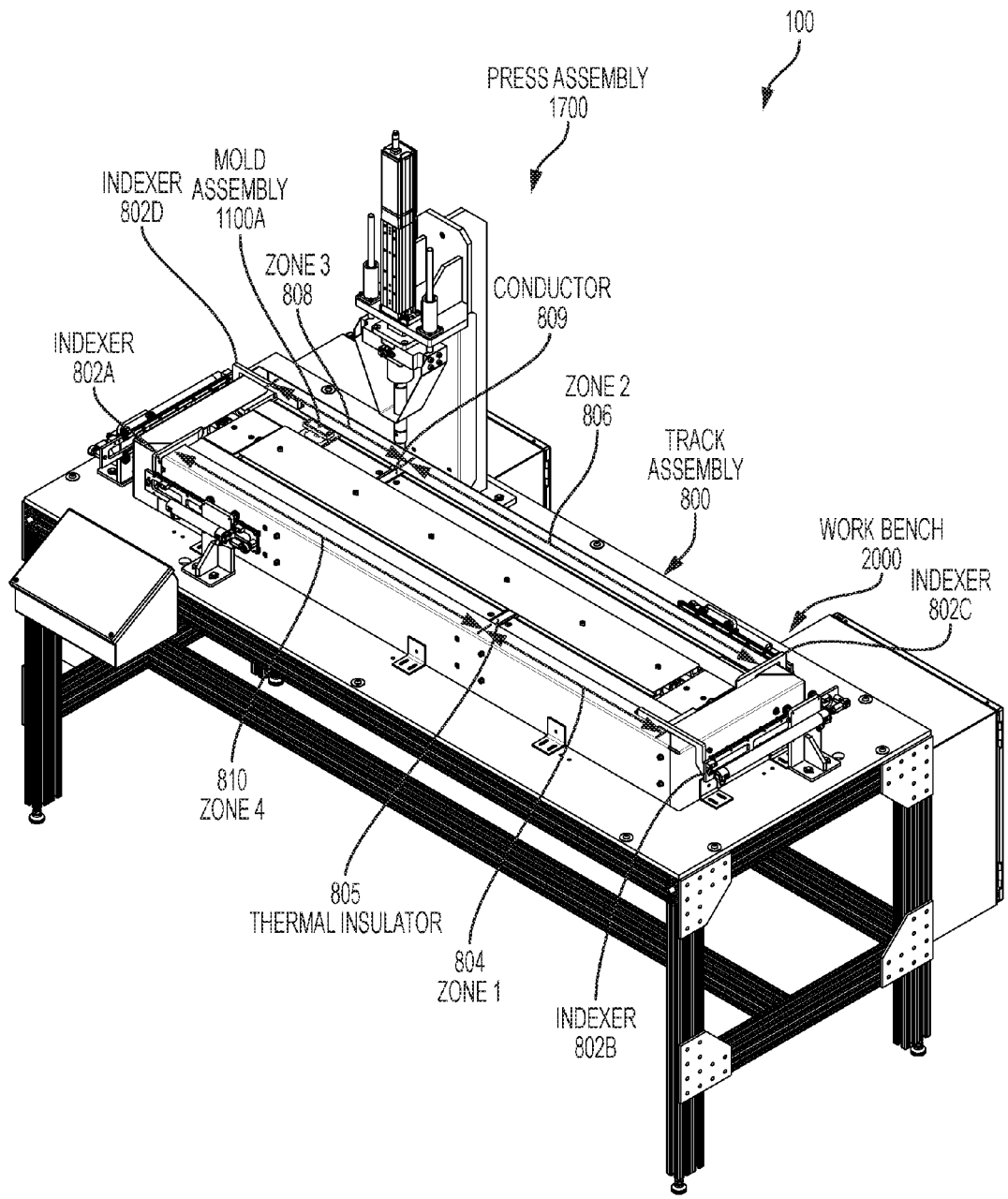
FIG. 6 shows the exemplary apparatus of FIG. 1, with a mold in the fourth exemplary position with an exemplary press applying pressure to the mold according to one embodiment of the present disclosure.

Once the system receives an indication that the timer for the press assembly 1700 has timed out or that the porogen has displaced with a surface of the piece of material by the particular distance, the system retracts the press actuator and the mold assembly 1100A is indexed across the conductor 809 to zone 3 808 as shown in FIG. 6.

In conductor 809 may be any suitable conductor. In particular embodiments, the conductor 809 is aluminum (or other suitable heat conducting material discussed herein) and conducts heat from zone 2 806 to zone 3 808. In some embodiments, conductor 809 may be a thermal insulator (such as a thermal insulator similar to thermal insulator 805) for separating the heat from zone 2 806 and zone 3 808.

In particular embodiments, the indexer 802C moves the mold assembly 1100A from under the press assembly 1700 to the position shown in FIG. 6 (e.g., in zone 3 808). As will be understood from discussions herein, the indexer 802C may move the mold assembly 1100A any suitable distance (as discussed in regards to the indexer 802A) and may move the mold assembly 1100A by pushing mold assemblies closer to the indexer 802A a particular distance, which, in turn, pushes the mold assembly 1100A the particular distance.

Turning to FIG. 6, mold assembly 1100A is shown in zone 3 808. Zone 3 808, in the embodiment shown, includes one or more heating elements under the surface of the track assembly 800 for heating or holding the mold assembly 1100A to or at a predetermined temperature. In various embodiments, the track assembly 800 further includes various sensors (not shown) for measuring the approximate temperature of the mold assembly 1100A.

The predetermined temperature may be any suitable temperature and may be the same temperature as discussed above regarding zone 2 806. In some embodiments, the one or more heating elements of zone 3 808 may heat the mold and piece of material to a temperature other than that of zone 2 806. As a particular example, the one or more heating elements of zone 3 808 may be configured to heat the mold and piece of material to a temperature higher or lower than that of zone 2 806. In some embodiments, the one or more heating elements of zone 3 808 may hold the mold and piece of material at the predefined temperature (e.g., the system may sense the temperature of the mold assembly 1100A and may automatically adjust the heat of the one or more heating elements to hold the mold and piece of material at the predefined temperature).

At a particular point in time or upon a particular event, the system indexes the mold assembly 1100A from zone 3 808 to zone 4 810 via the indexer 802D, as shown in FIG. 7. In particular embodiments, zone 4 810 does not include any heat elements and allows the mold assembly 1100A to cool.

According to particular embodiments, after the mold assembly 1100A cools, the porogen is removed from the piece of material in any suitable way, including, but not limited to by leaching, washing, etching, vaporizing, volatilizing, etc. For example, in embodiments where the porogen layer includes sodium chloride grains, some or all of the sodium chloride grains may be removed by leaching (e.g., dissolving all or a portion of the porogen layer with a particular solvent).

As will be understood from discussions herein, a particular piece of material may be subjected to the process above more than once. In a particular embodiment, the particular piece of material may go through the process above for a first surface, then again for a second surface (e.g., the particular piece of material is processed for a first surface as described above, then re-loaded into a mold assembly such that a second surface is processed).

Exemplary Apparatus
Track Assembly

Figure 8:
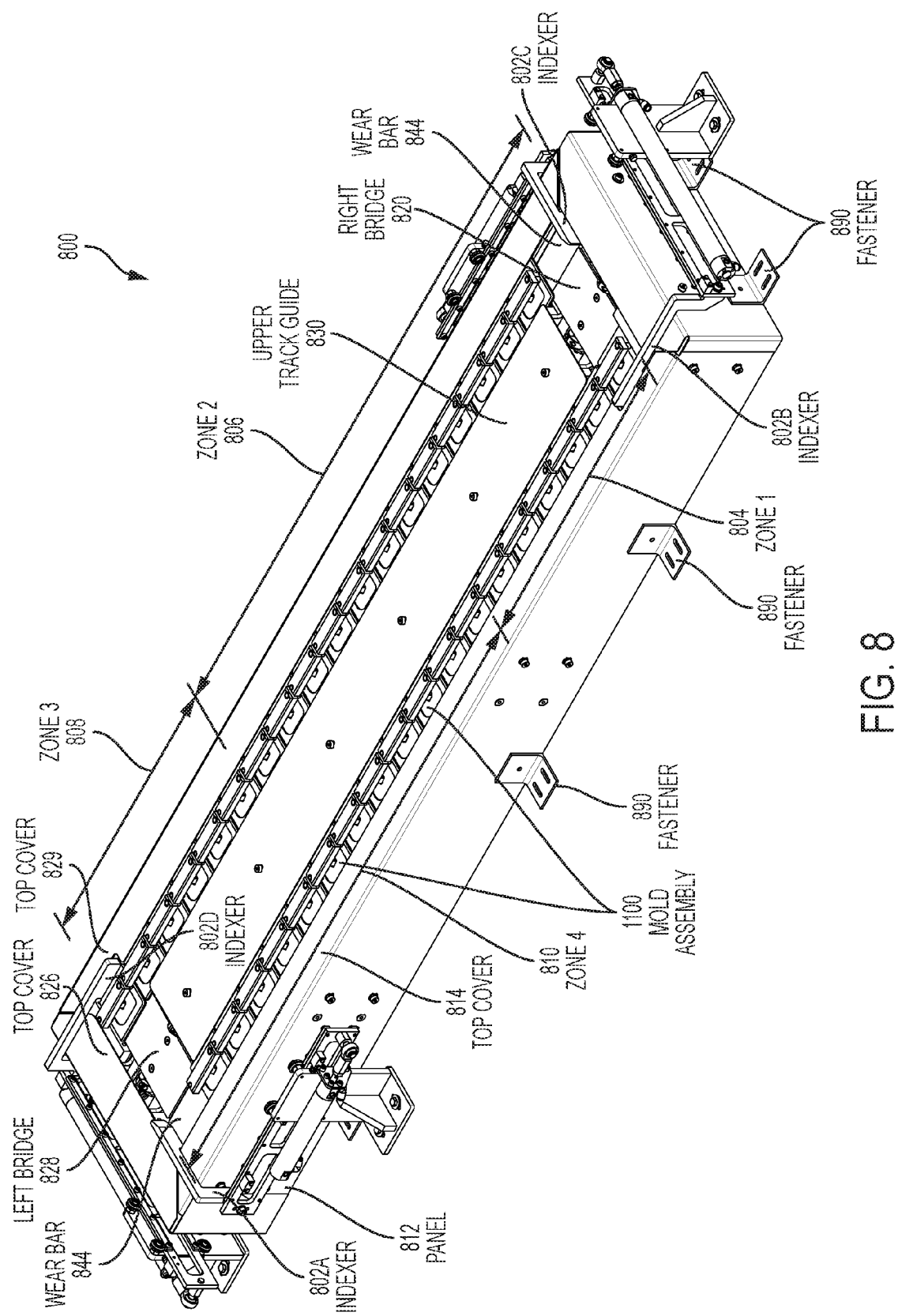
FIG. 8 shows an exemplary guide path assembly of the exemplary apparatus of FIG. 1 according to one embodiment of the present disclosure.
Figure 9:
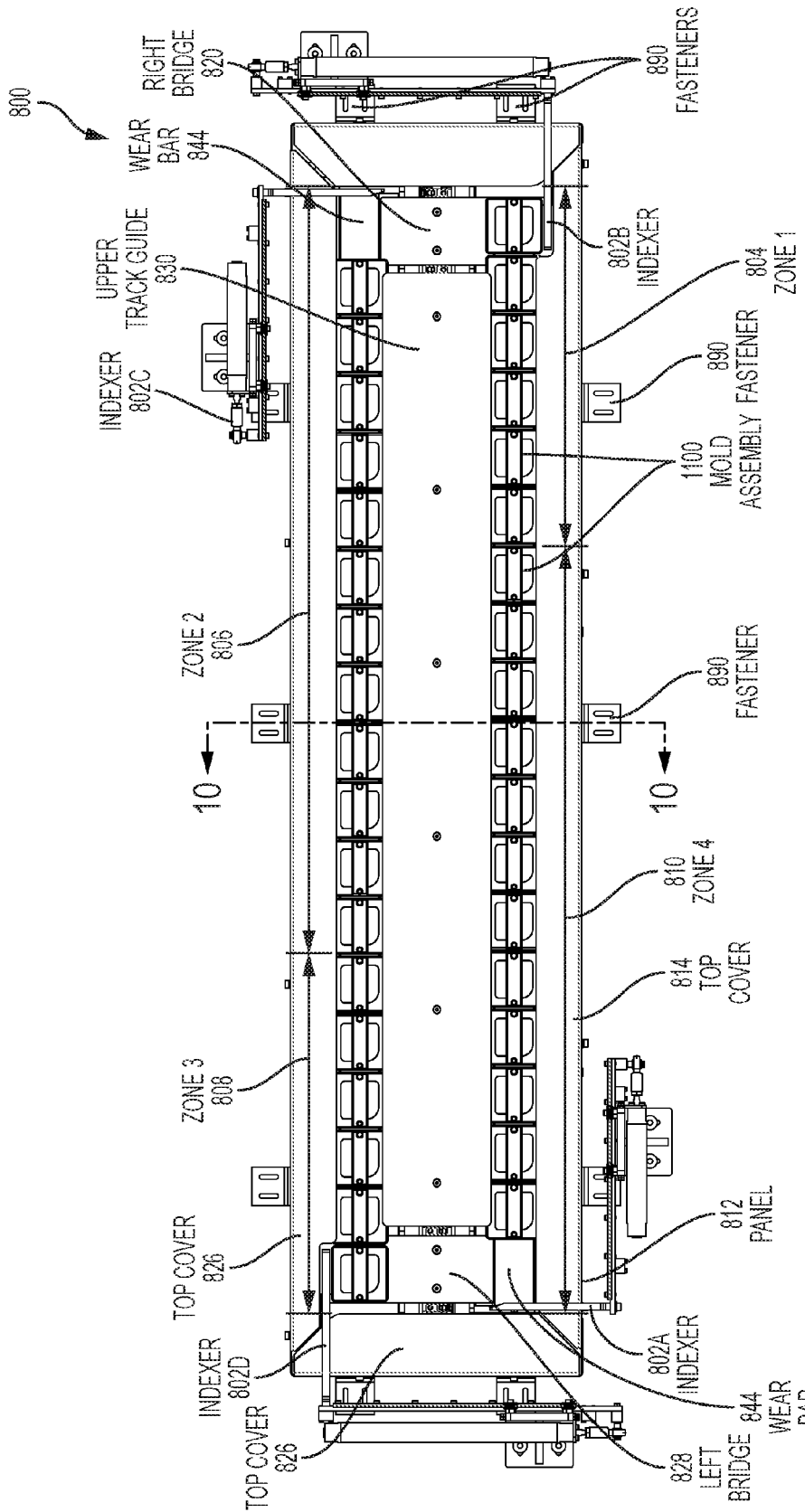
FIG. 9 shows a top view of the exemplary guide path assembly of FIG. 8 according to one embodiment of the present disclosure.
Figure 10:
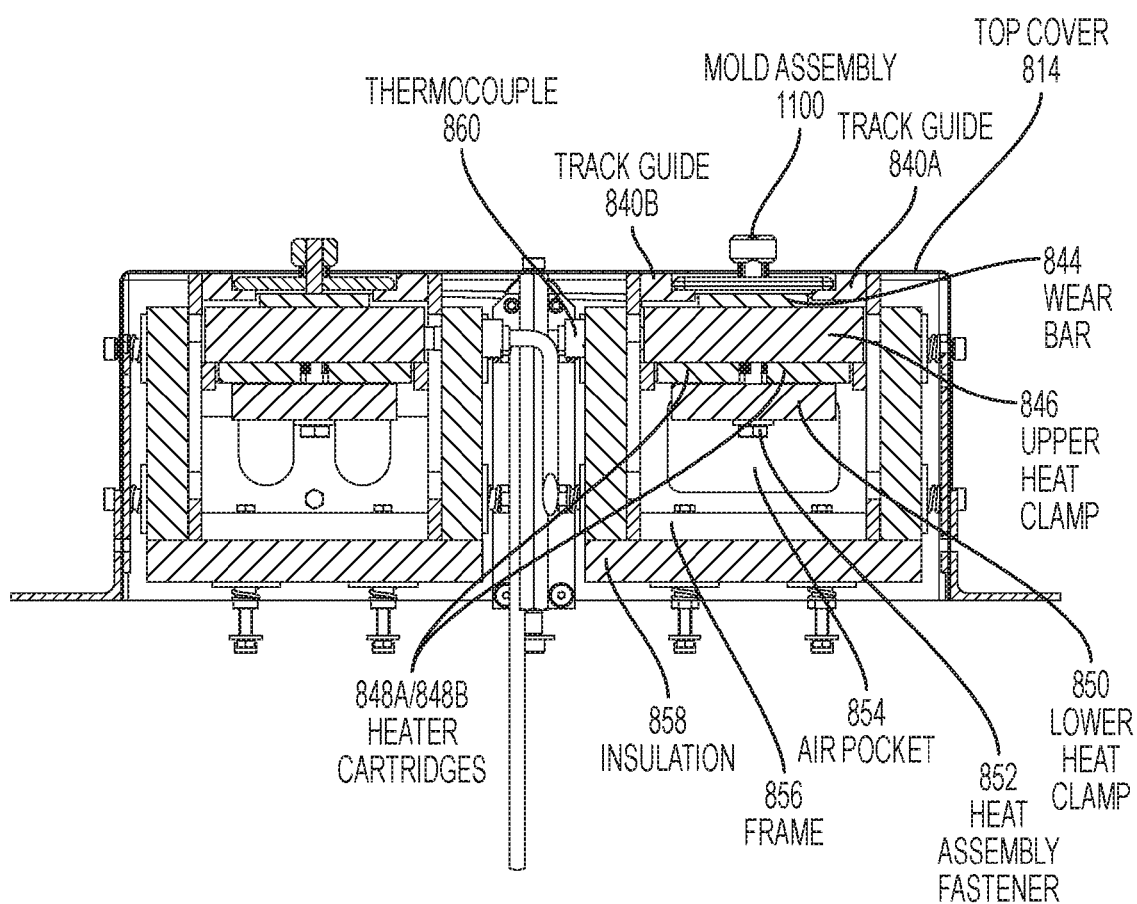
FIG. 10 shows an exemplary cross-section of the exemplary guide path assembly of FIG. 8 according to one embodiment of the present disclosure.
Figure 15:
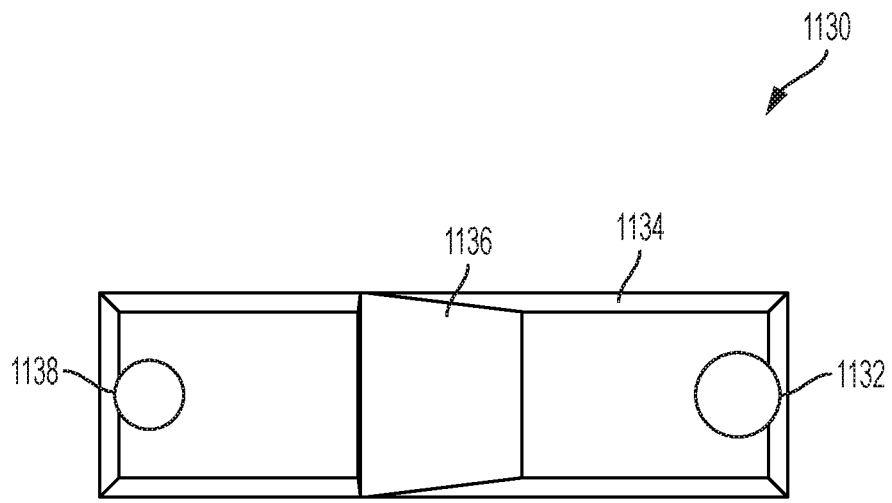
FIG. 15 shows a top view of an exemplary static weight according to one embodiment of the present disclosure.
Figure 16:
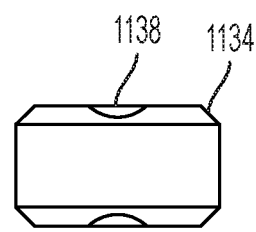
FIG. 16 shows a side view of an exemplary static weight according to one embodiment of the present disclosure.
Figure 17:
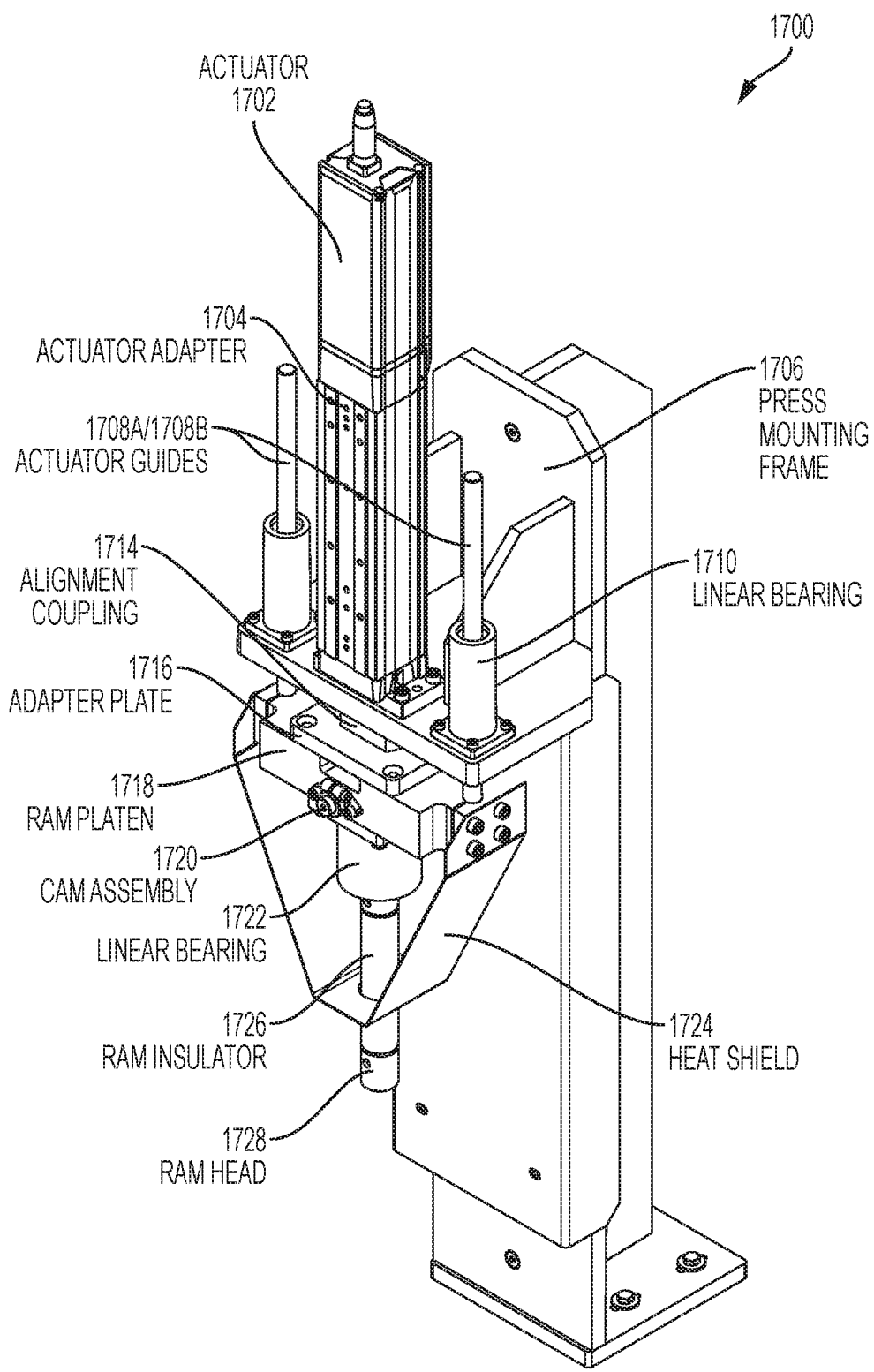
FIG. 17 shows an exemplary press according to one embodiment of the present disclosure.
Figure 18:
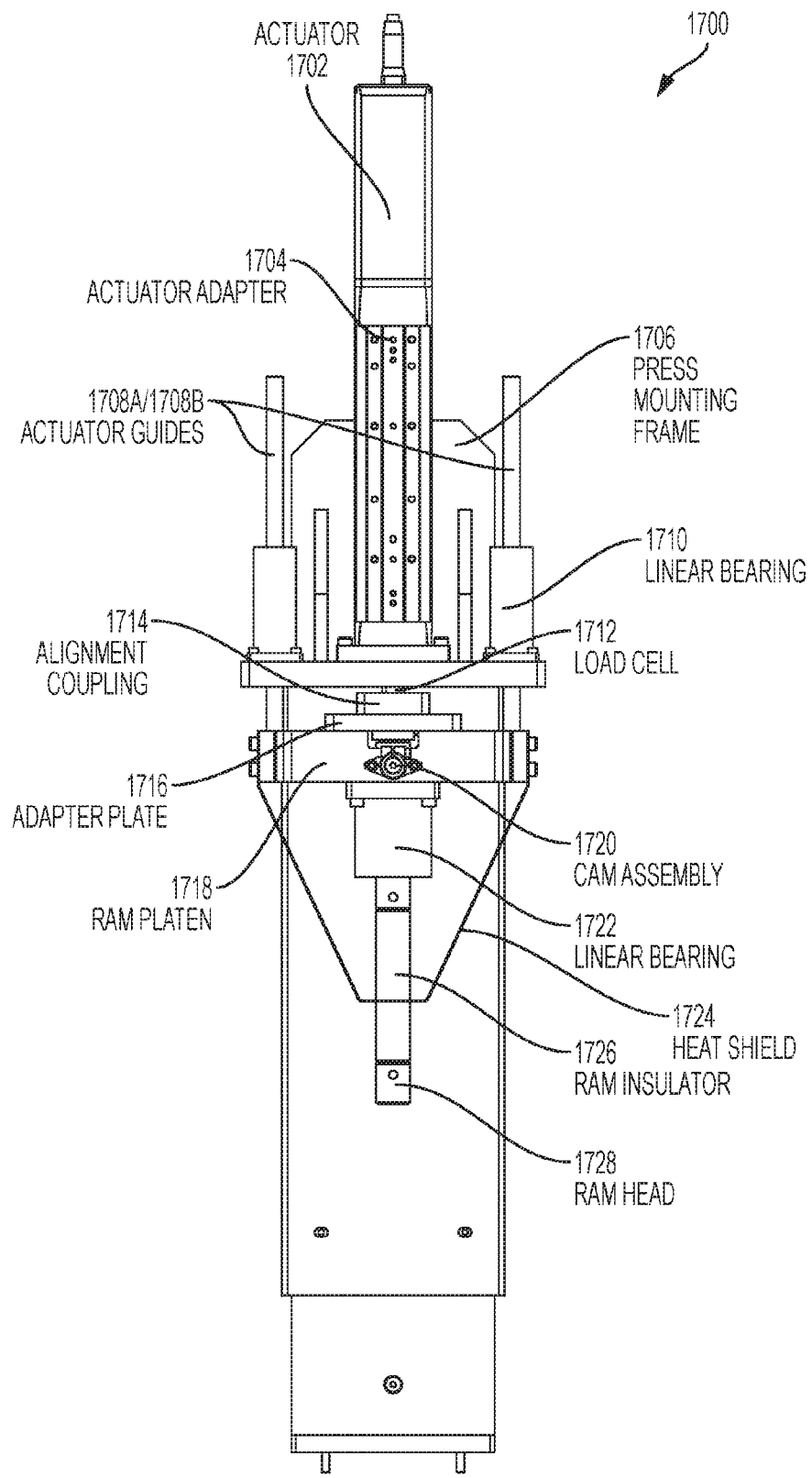
FIG. 18 shows a front view of an exemplary press according to one embodiment of the present disclosure.
Figure 19:
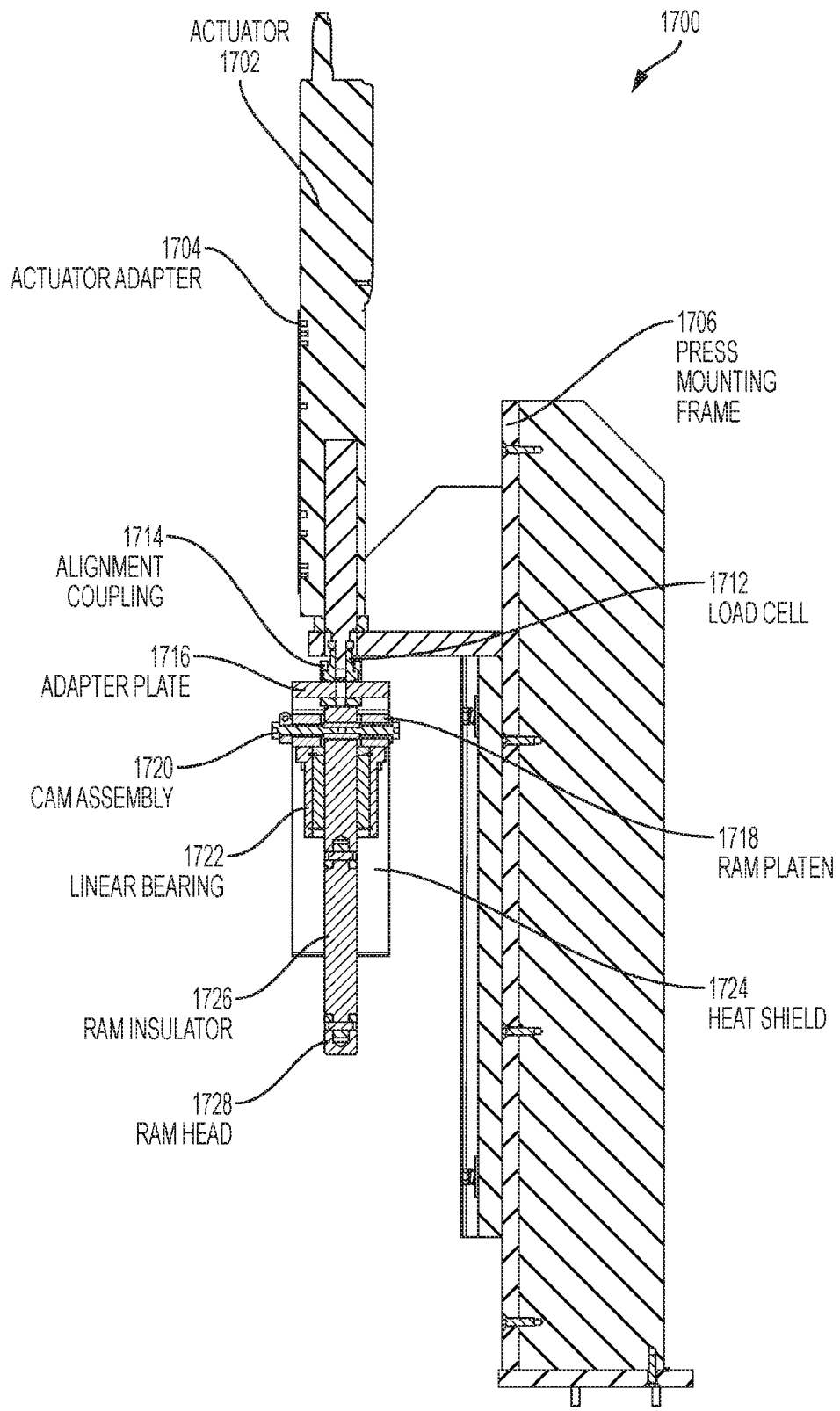
FIG. 19 shows a cross-section of the exemplary press of FIG. 18 according to one embodiment of the present disclosure.

FIGS. 8-19 show various components of the processing machine 100. In particular, FIGS. 8, 9, and 10 show various views of an exemplary track assembly 800, including the one or more mold assemblies 1100. FIGS. 11-16 show various views of an exemplary one of the one or more mold assemblies 1100. FIGS. 17-19 show various views of the exemplary press assembly 1700.

Beginning with FIG. 8, exemplary track assembly 800 is shown. As discussed above, the exemplary track assembly 800 moves the one or more mold assemblies 1100 through zones, such that a piece of material (loaded into each of the one or more mold assemblies) is heated and pressed to create a porous device. As previously discussed, the track assembly 800 is, in various embodiments, broken into four zones: zone 1 804; zone 2 806; zone 3 808; and zone 4 810. Further, as previously discussed, the track assembly includes thermal insulator 805 and conductor 809 (not shown in FIG. 8), the one or more mold assemblies 1100, and the indexers 802A, 802B, 802C, and 802D. Moreover, as shown in FIG. 8, the track assembly 800 includes one or more side panels 812, a top cover 814, a wear bar 844, a right bride 820, a top cover 826, a top cover 829, a top cover 832, a left bridge 828, and an upper track guide 830.

As discussed in regards to FIGS. 2-7, the track assembly 800 includes thermal insulator 805 and conductor 809, which, in various embodiments, separate the track assembly 800 into different "zones." As will be understood, in the embodiment shown, the thermal insulator 805 helps keep heat isolated in zones 2 806 to control the temperature of the piece of material loaded into the one or more mold assemblies 1100.

As will be understood from discussions herein, the thermal insulator 805 may be in any suitable location. In particular embodiments, the thermal insulator 805 is located such that the one or more mold assemblies 1100 are within zones 1 804 for a predetermined period of time (e.g., because this zone, in various embodiments, applies heat to the one or more mold assemblies 1100, the distance between thermal insulator may indicate a particular processing time for a particular mold assembly). In some embodiments, the thermal insulator 805 is located at a distance that is a function of the size of the track assembly 800. In these embodiments (and others) the thermal insulator 805 is located at approximately 60% of the distance of the front side of the track assembly (e.g., as measured from the front left side of the track assembly). Further, in these embodiments, the conductor 809 may be located approximately 15% of the distance of the back side of the track assembly (e.g., as measured from the back left side of the track assembly).

Further, as will be understood from discussions herein, the thermal insulator 805 may be any suitable height. In various embodiments, the thermal insulator 805 is the same height as the height of the wear bar 844 of the track assembly 800 (e.g., the thermal insulator 805 substantially runs from the top of the work bench assembly 2000 to the top surface of the wear bar 844 of the track assembly 800, as shown in FIG.

2). In some embodiments, the thermal insulator 805 is approximately half the height of the track assembly 800 and is mounted such that the top surface of the thermal insulator 805 is substantially flush with a top surface of the wear bar 844, but only extends downward approximately half the distance to the top of the work bench 2000. In further embodiments, the thermal insulator 805 is a different suitable height (e.g., a height to insulate the one or more heating elements only, a height of one to five centimeters, a height of two centimeters to one meter, etc.).

There may be any suitable number of thermal insulators and/or conductors. In the embodiments shown, there is one thermal insulator and one conductor (e.g., thermal insulator 805 and conductor 809). In some embodiments, the track assembly 800 may not include any thermal insulators or conductors (e.g., heat is applied to the one or more mold assemblies other than via heating elements under a surface of the track assembly 800, etc.). In various embodiments, there are more than two thermal insulators (e.g., and in some embodiments, more than two zones where heat is applied to the one or more mold assemblies 1100). As a particular example, in alternate embodiments, the track assembly may include four thermal insulators such that the one or more mold assemblies 1100 are held at a different processing temperature between each set of two thermal insulators.

According to particular embodiments, the location of the thermal insulator 805 and conductor 809 is a function of processing and displacement time. In these embodiments, the thermal insulator 805 and conductor 809 mark a distance that equates to a predetermined amount of time that the one or more mold assemblies are held at a particular processing temperature prior to pressure being applied by the press assembly 1700. As a particular example, a predetermined processing time is approximately thirty minutes (including time at the press assembly 1700, which, as shown herein, is within zone 3 808). Continuing with this particular example, each of the one or more mold assemblies 1100 is approximately ten centimeters in length. Further, it takes approximately four minutes of the press assembly 1700 applying pressure to the piece of material to displace the porogen through a surface of the piece of material, in this example. Continuing with this example, the distance between the thermal insulator 805 and conductor 809 is approximately seventy-six linear centimeters (e.g., it takes approximately 30 minutes for a particular mold assembly to move from thermal insulator 805 to conductor 809 based on a four minute cycle time).

The thermal insulator 805 may be any suitable material with a low thermal conductivity. In particular embodiments, the thermal insulator 805 is one or more types of ceramics, fiberglass, glass, cellulose, polystyrene foam (Styrofoam), urethane foam, vermiculite, perlite, cork, wool, silicon, for a combination of the above. As will be understood by one of ordinary skill in the art, the material used in the thermal insulator 805 may depend upon the amount of heat to be contained and/or applied to the one or more mold assemblies 1100.

The thermal insulator 805 and conductor 809 may be operatively connected to the track assembly 800 in any suitable way. In particular embodiments, the thermal insulator 805 and conductor 809 are pressed between two sections of the track assembly 800, such as sections of the wear bar 844 (discussed in relation to FIG. 10), the tracks guides 840, and/or insulation (as shown in FIG. 10). In some embodiments, the thermal insulator 805 and conductor 809 are operatively connected to the wear bar 844, track guides 840, other insulation, or other internal (or external) components of the track assembly 800 by a suitable fastener (or fasteners).

In the embodiment shown in FIG. 8, the track assembly 800 includes guides for one or more mold assemblies 1100. As further discussed below, in the embodiment shown in FIG. 8, the track assembly 800 includes one or more track guides 840 (not shown) and the wear bar 844 (not shown) for guiding the bottom or lower portion of the one or more mold assemblies 1100 and upper guides formed by the top covers (e.g., top covers 814, 826, 829, 832) on one side and the upper track guide 830 on the other side for guiding an upper portion of the one or more mold assemblies 1100. In some embodiments, the track assembly 800 is configured to guide the one or more mold assemblies 1100 through the process via different guides or without guides altogether. In particular embodiments, the track assembly 800 does not include track guides, but the one or more mold assemblies 1100 travel along a predetermined path of the track assembly along the wear bar 844 or other surface without guides.

In the embodiment shown in FIG. 8, the track assembly 800 includes four indexers: the indexers 802A, 802B, 802C, and 802D (collectively "the indexers 802"). As discussed above, the indexers 802 move each of the one or more mold assemblies 1100 along the track assembly 800. As shown in FIG. 8, indexers 802A and 802C move each of the one or more mold assemblies 1100 forward along the track assembly 800 by a distance equal to the length of one mold assembly. Further, as shown in FIG. 8, indexers 802B and 802D move each of the one or more mold assemblies a distance equal to the length of the track between zones 1 804 and zone 2 806 and between zones 3 808 and zone 4 810, respectively.

As shown, the indexers 802 are located at corners of the track assembly 800. In various embodiments, the indexers 802 are located in different, additional, or fewer locations (e.g., there are more or less than four indexers). In alternate embodiments, as discussed below, the track assembly 800 may include a different mechanism for moving the one or more mold assemblies 1100.

The indexers 802 may be any suitable shape. In the embodiment shown, the indexers 802 are generally rectangular in shape, with a linkage portion and an index portion, where the linkage portion is connected to an actuator (e.g., a hydraulic cylinder or the like) and the indexing portion is for pushing the one or more mold assemblies 1100 along the track assembly 800. In particular embodiments, the linkage and indexing portions are substantially rectangular, with a length and width substantially greater than a thickness of the indexer. In some embodiments, the indexing portion of the indexers 802 has a width that is greater than the width of the linkage portion of the indexer. In the embodiment shown in FIG. 8, the indexers 802 include an indexing portion with a width that is approximately the depth of the track of the track assembly 800 (e.g., to push the one or more mold assemblies along the track guides 840 (as shown in FIG. 10) of the track assembly 800).

The indexers 802 may include any suitable material or materials. In particular embodiments, the indexers 802 include stainless steel. In some embodiments, the indexers 802 include aluminum, a composite material, plastic, or other suitable materials. In further embodiments, the indexers 802 include reinforced steel or other metal. In still further embodiments, the indexers 802 include any material suitable for resisting the high heat produced by the system.

Continuing with FIG. 8, the track assembly 800 includes one or more side panels 812. In various embodiments, the one or more side panels 812 include sheet metal and are operatively connected to the work bench 2000 and other portions of the track assembly 800. In particular embodiments, the one or more side panels 812 are made of another suitable material and/or are connected to another portion of the track assembly 800 and/or work bench 2000.

In the embodiment shown, the track assembly 800 includes the top covers 814, 826, 829, and 832. In some embodiments, the top covers 814, 826, 829, 832, insulate the interior components of the track assembly 800. In at least one embodiment, the top covers 814, 826, 829, 832 connect various components of the track assembly 800 to the work bench 2000 (e.g., some components of the track assembly 800 may be operatively connected to the top covers 814, 826, 829, 832, which are connected to the work bench 2000 through side panel 812). In embodiments, the top covers 814, 826, 829, 832 include an overhang or are otherwise over the one or more track guides 840 to provide an upper guide to the one or more mold assemblies 1100 (e.g., the top covers 814, 826, 829, 832 provide an upper guide to a portion of the one or more mold assemblies 1100, while the one or more track guides 840 provide a lower guide to the one or more mold assemblies 1100 as shown and discussed in regards to FIG. 10). The top covers 814, 826, 829, 832 may include any suitable material, including sheet metal, stainless steel, etc.

As shown in FIG. 8, the track assembly 800 includes a track or wear bar 844, which the one or more mold assemblies 1100 pass over. In particular embodiments, as will be shown in FIG. 10, the one or more mold assemblies 1100 slide along the track guides 840 and over the wear bar 844. In some embodiments, the track assembly 800 may be configured such that the one or more mold assemblies 1100 slide directly on the wear bar 844 (e.g., without the track guides 840). In at least one embodiment, the track assembly 800 is configured such that the one or more mold assemblies 1100 pass over the wear bar 844 along the track guides 840 along a front and back portion of the track assembly (e.g., through zones 1, 2, 3, and 4), but slide directly along the wear bar 844 or bridge portions of the track assembly (e.g., between zones 1 804 and 2 806 and between zones 3 808 and 4 810).

In various embodiments, the wear bar 844 spans the length of travel of the one or more mold assemblies 1100. In some embodiments, the wear bar 844 spans less than the length of travel of the one or more mold assemblies 1100 (e.g., the wear bar spans a portion of the length of travel of the one or more mold assemblies 1100 along a front or back of the track assembly 800 and the one or more mold assemblies 1100 travel along the track guides 840). The wear bar 844 and the track guides 840 will be further discussed in relation to FIG. 10.

Continuing with FIG. 8, the track assembly 800 includes the upper track guide 830. In the embodiment shown, the upper track guide 830 is for covering the internal components of the track assembly 800 and for guiding the one or more mold assemblies 1100 down the one or more track guides 840. In the embodiment shown, the upper track guide 830 is fastened to a portion of the track assembly such that it extends over the one or more track guides 840 such that a portion of the one or more mold assemblies 1100 passes under the upper track guide 830 and over the one or more track guides 840.

The upper track guide 830 may include any suitable material. In one embodiment, the upper track guide 830 is substantially sheet metal (steel). In other embodiments, the upper track guide 830 includes other suitable materials such as other metals, ceramics, etc.

The track assembly 800 may include any suitable fasteners. As shown in FIG. 8, the track assembly 800 includes fasteners for connecting the track assembly 800 to the work bench 2000. As will be understood from discussions herein, the track assembly 800 may include any suitable fasteners at any suitable location, including the fasteners shown in FIG. 8. In some embodiments, the track assembly 800 may include more or less fasteners than those shown in FIG. 8.

FIG. 9 shows a top view of the track assembly 800 shown in FIG. 8. FIG. 9 shows a cross-section line corresponding to a cross-sectional view of the track assembly 800, which will be shown and discussed in FIG. 10.

Turning now to FIG. 10, this cross-sectional view of the track assembly 800 includes a cross-sectional view of one of the one or more mold assemblies 1100 on the track guides 840A and 840B, which are, in the embodiment shown, operatively connected to the interior of the track assembly 800. As shown in FIG. 10, just under the one or more mold assemblies 1100 is a wear bar 844. The wear bar 844, in the embodiment shown, is directly above a heating assembly, which includes an upper heat clamp 846, heater cartridges 848A and 848B, a lower heat clamp 850, at least one thermocouple 860, and one or more fasteners 852. Below the heating assembly, in the embodiment shown, is an air pocket 854 formed by a portion of the frame 856 of the track assembly 800 and the heating assembly. As shown in FIG. 10, the portion of the frame 856 is surrounded by a layer of insulation 858.

In the embodiment shown, the track assembly 800 includes track guides 840A and 840B. In this embodiment (and others), the track guides 840A and 840B support the one or more mold assemblies 1100 as they are indexed around the track assembly 800 (e.g., as they are processed). In particular embodiments, the track guides 840A and 840B support the one or more mold assemblies 1100 as they are indexed through zone 1 804, zone 2 806, zone 3 808, and zone 4 810.

As will be understood from discussions herein, the track guides 840A and 840B may include any suitable material. As further discussed herein, one or more heating elements (e.g., heater cartridges 848A and 848B) may heat the one or more mold assemblies 1100 to temperature of over 300 degrees Celsius in some embodiments. In these embodiments, the track guides 840A and 840B include a material suitable for sustaining such a temperature for a long period of time (e.g., a material that will not melt or begin to melt at this or other processing temperatures), such as stainless steel, aluminum, brass, copper, iron, gold, silver, etc. In particular embodiments, the track guides 840A and 840B include a material (or more than one material) that withstands wear from the one or more mold assemblies traveling along (or being pushed along) the track guides 840A and 840B, such as stainless steel.

According to particular embodiments, the track guides 840A and 840B are substantially "L" or elbow shaped from a cross-sectional perspective and run along the length of the track assembly (e.g., through zone 1 804, zone 2 806, zone 3 808, and zone 4 810) such that the track guides 840A and 840B provide lower and side support for the one or more mold assemblies 1100. In these embodiments, (and others), the track guides 840A and 840B support and "guide" the one or more mold assemblies 1100 along the track assembly 800 for processing.

In at least one embodiment, the track guides 840A and 840B are operatively connected to the frame 856 of the track assembly 800 through any suitable fastening mechanisms (e.g., bolts, screws, nails, or adhesives (that can withstand temperatures over 300 degrees Celsius)). In particular embodiments, the track guides 840A and 840B are operatively connected to the heat clamp 846 or insulation 858. In some embodiments, the track guides 840A and 840B are operatively connected to any other suitable part of the track assembly 800, work bench 2000, or other suitable component of the system.

Continuing with FIG. 10, in the embodiment shown, the track assembly 800 includes a wear bar 844 for supporting the one or more mold assemblies 1100 and for facilitating transfer of heat to the one or more mold assemblies 1100 from the heater cartridges 848A and 848B (as further discussed below). In particular embodiments, the wear bar 844 is operatively connected to the frame 856 of the track assembly 800. In some embodiments, the wear bar 844 is connected to the upper heat clamp 846 or another part of the heater assembly of the track assembly 800. In particular embodiments, the wear bar 844 is located on top of the upper heat clamp 846 and between the track guides 840A and 840B. In these embodiments, the wear bar 844 may be press fit between the track guides and/or the upper heat clamp 846 (e.g., the wear bar 844 is connected to the track assembly by contact, but not using any fasteners).

The wear bar 844 may include any suitable materials. According to particular embodiments, the wear bar 844 includes aluminum to assist with transferring heat from the heater cartridges 848A and 848B (e.g., aluminum has high thermal conductivity and may direct and transfer heat from the heater cartridges 848A and 848B to the one or more mold assemblies 1100 through direct contact with the upper heat clamp and the one or more mold assemblies 1100). In some embodiments, the wear bar 844 may include other materials such as steel, steel with carbon (or other additives), gold, copper, brass, or any other suitable material for transferring heat from the heater cartridges to the one or more mold assemblies 1100 (e.g., an suitable material or materials with a high thermal diffusivity, which is a function of thermal conductivity, density, and specific heat).

The wear bar 844, in the embodiment shown in FIG. 10, has a cross-section shape that is generally rectangular and is longer than it is wide or tall. In this particular embodiment, the wear bar 844 substantially runs the length of the front and back of the track assembly 800 (e.g., through zone 1 804, zone 2 806, zone 3 808, and zone 4 810). In some embodiments, the wear bar 844 has a shape other than as shown in FIG. 10, such as, for example, a cross-sectional square shape, a cross-sectional substantially triangular shape (where the one or more mold assemblies 1100 contact the wear bar 844 at the apex of the substantially triangular-shaped wear bar 844), a cross-sectional arcuate shape, etc.

As shown in FIG. 10, the wear bar 844 is in contact with the upper heat clamp 846. In the embodiment shown, the upper heat clamp 846 and the lower heat clamp 850 hold the heater cartridges 848A and 848B in place under the one or more mold assemblies 1100. Further, in this embodiment, the upper heat clamp 846 and the lower heat clamp 850 have a heat assembly fastener 852 that attaches to each of the upper heat clamp 846 and the lower heat clamp 850 and passes between the heater cartridges 848A and 848B. In this way, in this embodiment, the heat assembly fastener 852 is tightened such that the upper heat clamp 846 and the lower heat clamp 850 "clamp" the heater cartridges 848A and 848B between them.

The upper heat clamp 846 and the lower heat clamp 850 may include any suitable materials, such as stainless steel, aluminum, copper, brass, etc. In various embodiments, the upper heat clamp 846 includes a different material than the lower heat clamp 850 to facilitate upwards transfer of heat from the heater cartridges 848A and 848B to the one or more mold assemblies 1100 (e.g., via the wear bar 844).

In particular embodiments, the upper heat clamp 846 and the lower heat clamp 850 are operatively connected to the frame 856 of the track assembly 800 via one or more fasteners (e.g., bolts, screws, nuts, etc.). In at least one embodiment, the upper heat clamp 846 sits on top of a portion of the frame 856 (or insulation 858) with or without any fasteners and is attached to the lower heat clamp 850 via the heat assembly fastener 852, thereby supporting the heater cartridges 848A and 848B and lower heat clamp 850 via the frame 856.

The heater cartridges 848A and 848B may be any suitable heating elements for heating the one or more mold assemblies 1100. According to a particular embodiment, the heater cartridges 848A and 848B are resistance heating elements (e.g., electricity is passed through the heater cartridges 848A and 848B to create heat) and may include metal, ceramic, polymer, and/or composite (e.g., metal and ceramic) materials. In some embodiments, the heater cartridges 848A and 848B are another form of heating element, such as, for example, furnace or boiler heated elements.

The track assembly 800 may include any number of heating elements, such as heater cartridges 848A and 848B. In the embodiment shown in the figures, the track assembly 800 includes the heater cartridges 848A and 848B (as shown in FIG. 10, in zones 1 804 and 2 806) as well as similar heating elements in zones 3 808 and 4 810. As will be understood from discussion herein, the track assembly 800 may include more than four heating elements and may include various types of heating elements (e.g., the four or more heating elements may each be a different type of heating element). As will be further discussed below, the track assembly 800 may include less than four heating elements or a single heating element in particular embodiments.

As shown in FIG. 10, the track assembly 800 further includes an air pocket 854 below the lower heat clamp 850 and above the frame 856. In various embodiments, the air pocket 854 insulates the heater cartridges 848A and 848B (air has a low thermal conductivity), such that heat flows upward toward the one or more mold assemblies 1100. As will be understood from discussions herein, in various embodiments, the track assembly 800 may include insulation, a vacuum, or other materials in place of the air pocket 854.

Continuing with FIG. 10, the track assembly 800 includes the frame 856. As will be understood from discussions herein, the frame 856, in particular embodiments, connects the various elements of the track assembly 800 (e.g., each of the various elements of the track assembly 800 connect directly or indirectly to the frame 856). In some embodiments, the frame 856 includes one or more metals, such as stainless steel, iron, aluminum, etc.

As shown in the embodiment depicted in FIG. 10, the track assembly includes insulation 858, which, in the embodiment shown, at least partially surrounds the heating elements of the track assembly 800. As will be understood from discussions herein, the track assembly 800 may include any suitable amount of insulation 858 and the insulation 858 may surround three sides (of a cross-section of zone 2 808, for example) of the track assembly 800. In some embodiments, the insulation 858 includes fiberglass, wool, foam, rock wool, a film, carbon, etc.

As shown in FIG. 10, the track assembly 800 may include any suitable fasteners through the assembly and to attach the track assembly 800 to the work bench 2000. In various embodiments, the one or more fasteners 852 include brackets and bolts and nuts. In some embodiments, the one or more fasteners 852 include screws or nails or an adhesive. In further embodiments, the one or more fasteners 852 include bonding of materials such as welding, etc.

According to particular embodiments, the track assembly 800 includes one or more sensors. As shown in FIG. 10, for example, the track assembly 800 includes the at least one thermocouple 860 for measuring the heat of the heater cartridge 848A and 848B. In various embodiments, the track assembly 800 may include any suitable number of thermocouples to measure the heat of the heating elements of the track assembly 800 (e.g., one thermocouple per heating element, thermocouples distributed or spaced along a length of the track assembly 800, one or more thermocouples located above the track assembly 800, etc.). In further embodiments, the track assembly 800 includes various other sensors such as pressure sensors, motion sensors, light sensors, weight sensors, etc.

Mold Assembly

Figure 11:
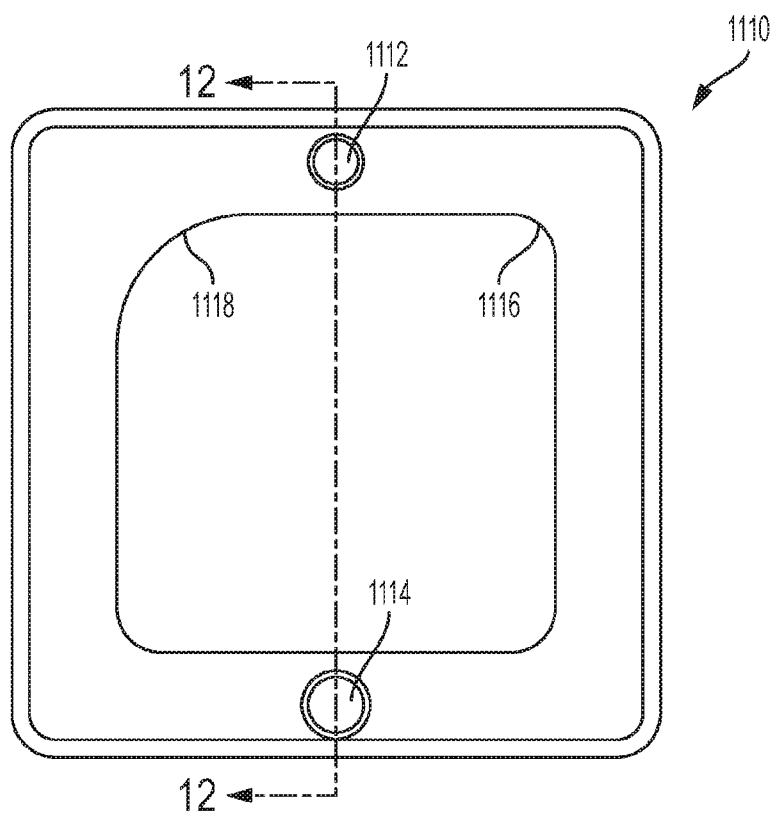
FIG. 11 shows a top view of an exemplary mold according to one embodiment of the present disclosure.
Figure 12:
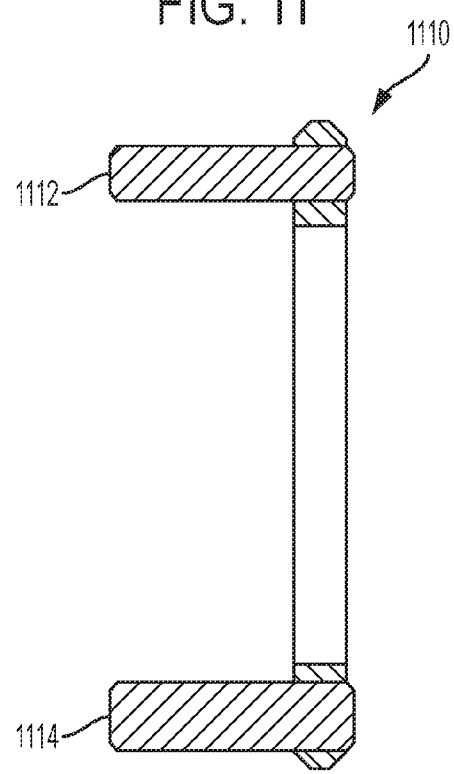
FIG. 12 shows a cross-section of the exemplary mold of FIG. 11 according to one embodiment of the present disclosure.

FIGS. 11-16 show various features of the one or more mold assemblies 1100. In particular, FIGS. 11-12 show features of a mold 1110 according to particular embodiments, FIGS. 13-14 show features of a mold insert 1120 according to particular embodiments, and FIGS. 15-16 show features of a static weight 1130 according to particular embodiments.

Turning to FIGS. 11 and 12, the mold 1110 is shown. In the embodiment shown, the mold 1110 includes pegs 1112 and 1114 and an opening including curves 1116 and 1118. In the embodiment shown, the mold insert 1120 (or a different mold insert) is placed in the opening, where the mold insert includes outer curves that match curves 1112 and 1114. Further, in the embodiment shown, the mold 1110 includes pegs 1112 and 1114 for receiving a static weight (e.g., static weight 1130).

The mold 1110 may be any suitable size. In particular embodiments, the mold 1110 is substantially square and is approximately fifteen centimeters in width and length and approximately two centimeters in height (e.g., thickness). In various embodiments, the mold 1110 is substantially rectangular with a width of approximately fifteen centimeters and a length of approximately thirty centimeters and approximately five centimeters in height (e.g., thickness). As will be understood from discussions herein, the size and shape of the mold 1110 may vary (e.g., scale) based on the size of the piece of material to be processed.

The mold 1110 may include any suitable materials. In a particular embodiment, the mold 1110 includes stainless steel. In some embodiments, the mold 1110 includes aluminum, iron, copper, brass, or another suitable material. In particular embodiments, the mold 1110 and the pegs 1112 and 1114 are made of different materials.

In particular embodiments, the mold 1110 includes pegs 1112 and 1114, which are integrally formed with the base of the mold 1110. In some embodiments, the mold 1110 includes pegs 1112 and 1114, which are attached to the base of the mold 1110 via a suitable fastener or adhesive.

The pegs 1112 and 1114 may be any suitable length (e.g., from the base of the mold 1110) and diameter. According to particular embodiments, the pegs 1112 and 1114 are a length suitable for holding a static weight placed on top of a piece of material loaded into the mold insert 1120 (e.g., the pegs 1112 and 1114 are longer than the height of the piece of material above the mold insert 1120 plus a portion of the height of the static weight 1130). In some embodiments, the pegs 1112 and 1114 are one to fifteen centimeters in length. In further embodiments, the pegs 1112 and 1114 are less than one centimeter in length. In still further embodiments, the pegs 1112 and 1114 are greater than fifteen centimeters in length (e.g., fifty centimeters, one meter, two meters, etc.). Further, the pegs 1112 and 1114 have a diameter of approximately two centimeters in a particular embodiment. In various embodiments, the pegs 1112 and 1114 have a diameter of less than two centimeters, more than two centimeters, greater than ten centimeters, etc. In further embodiments, the pegs 1112 and 1114 have diameters proportional to their length (e.g., the longer the peg, the greater the diameter) and/or different diameters.

As shown in the embodiment in FIGS. 11 and 12, the pegs 1112 and 1114 are substantially cylindrical. In various embodiments (not shown), the pegs 1112 and 1114 may be any other suitable shape, such as substantially rectangular, substantially square (from a cross-sectional view), substantially conical, etc.

As will be understood from discussions herein, the mold 1110 travels down the track assembly 800 and thus may be any suitable size, depending upon the size of the track assembly 800 and/or the amount of material to be processed. As shown in FIG. 1, the one or more mold assembles 1100 are substantially the width of the track of the track assembly 800. In various embodiments, the mold 1110 may be scalable to the size of the track assembly 800 and/or may be any suitable shape (e.g., the mold 1110 may be longer, shorter, or varying widths, may be substantially rectangular, etc.).

FIGS. 13-14 show various features of a particular embodiment of the mold insert 1120. The mold insert 1120, in the embodiment shown, is substantially square and includes curves 1124 and 1122, holes 1126 and 1129, void 1127, and a prong 1128. As will be understood from discussions herein, the mold insert 1120 may be configured for processing various shapes of materials (in some embodiments, various shapes of spinal cages). In such embodiments, the structure of the mold insert may be different for accommodating other shapes. For example, the void 1127 and prong 1128 may be a different shape and size, and the prong 1128 may not exist, or there may be more than one prong 1128.

Returning to FIGS. 13 and 14, the mold insert 1120 includes the curves 1124 and 1122. In various embodiments, the curves 1124 and 1122 substantially match the curves 1118 and 1116 of the mold 1110 such that the mold insert 1120 fits within the mold 1110 for processing. In some embodiments, the mold insert may not include the curves 1124 or 1122 and may instead include some other mechanism for insertion within mold 1110 (e.g., the mold insert 1120 may fit within a void of the mold 1110 that is not a through hole (not shown), the mold insert 1120 may include holes to fit on pegs operatively connected to the mold 1110, etc.).

In the embodiment shown, the mold insert 1120 includes the void 1127, which may be any suitable size or shape for receiving a piece of material. In general, the void 1127 is the size and shape of the piece of material to be processed. In the embodiment shown in FIG. 14, the void 1127 is a cut-out of the base of the mold insert 1120, but does not go through the mold base 1120. In various embodiments, the void 1127 has a depth of half the height of the mold insert 1120 (e.g., half the distance from a face of the mold insert 1120 to an opposing face of the mold insert 1120). In particular embodiments, the void 1127 has a depth of more or less than half the height of the mold insert 1120. In some embodiments, the void 1127 has a depth of approximately one centimeter (e.g., where the height of the mold insert is two centimeters).

According to particular embodiments, the mold insert 1120 includes the prong 1128, which is a portion of the base of the mold insert 1120 that has not been removed when creating the void 1127. In various embodiments, the prong 1128 is the same size and shape of a hole in a piece of material to be processed by the system as described herein. In particular embodiments, as discussed herein, the piece of material may be a different shape than that shown in FIGS. 13 and 14 and thus the prong 1128 may not exist (e.g., this portion of the base of the mold insert 1120 has been removed) and/or there may be multiple prongs or prongs in different locations.

In the embodiment shown, the mold insert 1120 includes the two holes 1126 and 1129. The two holes 1126 and 1129 are generally for placement and removal of the mold insert 1120 within the mold 1110, e.g., when the mold insert 1120 is loaded or unloaded from the mold 1110 via one or more tools that utilize the holes 1126 and 1129. As will be understood from discussions herein, the holes 1126 and 1129 may be any suitable size and shape for use with loading and/or unloading the mold insert 1120 into or from the mold 1110.

The mold insert 1120 may include other features not shown in FIGS. 13 and 14. In a particular embodiment, the mold insert 1120 may be stamped with (or otherwise include) a serial number identifying the piece of material that is processed (e.g., a serial number for identifying a resulting medical device for quality control purposes). In some embodiments, the mold insert 1120 includes multiple voids, prongs, pegs, holes, etc.

As discussed herein, once porogen and piece of material are loaded into the mold insert 1120 and the mold insert 1120 is loaded into the mold 1110, the static weight 1130 is placed onto the piece of material to press a surface of the piece of material onto the porogen. Turning to FIGS. 15 and 16, an exemplary static weight 1130 is shown. In this embodiment, the static weight 1130 includes two holes 1132 and 1138 for receiving the pegs 1112 and 1114 of the mold 1110. As discussed herein, the static weight 1130 applies a pressure to the piece of material, such as, for example, approximately 0.1 PSI to 10 PSI.

As further discussed below, as shown in zone 2 806, a piece of material loaded into the one or more mold assemblies 1100 is subjected to pressure in addition to the pressure applied by the static weight 1130 (described above). In these embodiments, the additional pressure is provided by the press assembly 1700, which will be discussed in regards to FIGS. 17-19, below.

Press Assembly

The exemplary processing machine 100 includes the press assembly 1700 as shown in FIG. 1. Features of the exemplary press assembly 1700 are shown in FIGS. 17-19. As shown in FIG. 1, the press assembly 1700 is operatively connected (mounted) to the work bench 2000 and/or to the track assembly 800 and is for applying pressure to a piece of material loaded into the one or more mold assemblies 1100 for displacing a layer of porogen through a surface of the piece of material. As discussed herein, the press assembly 1700 is operative for applying pressure to the piece of material of approximately 50 and 250 PSI.

Turning to FIGS. 17-19, an exemplary press assembly 1700 is shown. The exemplary press assembly 1700 includes an actuator 1702 operatively connected to an actuator adaptor 1704, a press mounting frame 1706 (e.g., for supporting the rest of the press assembly 1700), actuator guides 1708A and 1708B, which are operatively connected to linear bearings 1710A and 1710B. The exemplary press assembly 1700, in the embodiment shown, further includes a load cell 1712, an alignment coupling 1714, an adapter plate 1716, a ram platen 1718, a cam assembly 1720, a linear bearing 1722, a heat shield 1724, a ram insulator 1726, and a ram head 1728. As will be understood from discussions herein, as shown in FIG. 6, the actuator 1702 moves the ram downward via the ramp platen 1718 and the actuator guides 1708A and 1708B extend downward with the ram platen 1718.

The actuator 1702, in the embodiment shown, is a ball-screw electric actuator. As will be understood by one of ordinary skill the in the art, the ball screw actuator is a mechanical device that translates the rotational motion of ball bearings (rotational motion cause by electricity) to linear motion of a screw (e.g., an electrical motor causes the ram to move in a vertical direction, substantially perpendicular to a top surface of the track assembly 800). As will further be understood, the actuator 1702 may be any suitable type of actuator for applying force to a piece of material being processed. For example, the actuator 1702 may be a hydraulic, pneumatic, or another type of actuator.

The actuator 1702 is attached to the press mounting frame 1706 via the actuator adaptor 1704. In various embodiments, the actuator adaptor 1704 operatively connects to the press mounting frame via one or more suitable fasteners. In some embodiments, the actuator adaptor 1704 connects to the actuator 1702 by one or more fasteners or is press fit, such that the actuator 1702 is pressed into the actuator adaptor 1704 and is held in place by friction.

As shown in FIGS. 17-19, the press assembly 1700 includes actuator guides 1708A and 1708B, which are operatively connected to the press mounting frame 1706 via the linear bearings 1710A and 1710B. As will be understood by one of ordinary skill in the art, the actuator guides 1708A and 1708B and linear bearings 1710A and 1710B assist the ram head in accurately applying pressure to a piece of material in a normal direction (e.g., such that the ram head 1728 does not contact the static weight or piece of material at an angle other than substantially 90 degrees from the top of the static weight and/or piece of material).

Operatively connected to the press mounting frame 1706 is the load cell 1712. In various embodiments, the load cell 1712 is a sensor for measuring the amount of force that is being applied by the actuator. As discussed above, in particular embodiments, the press 1700 lowers the ram a particular distance, which presses a surface of the piece of material onto the porogen loaded into the one or more mold assemblies 1100. Once the load cell 1712 returns a reading of zero force being applied by the actuator, the system retracts the ram to a starting position (e.g., the reading of zero force or substantially zero force indicates that the porogen has been displaced within the surface of the material).

In various embodiments, the press assembly 1700 includes a cam assembly 1720 for preloading the actuator (e.g., for preventing backlash). In a particular embodiment, the cam assembly 1720 includes a flange collar fastened to the ram platen 1718 with one or more shoulder screws extending through the flange collar and the ram platen to a cam. In this embodiment, when the one or more shoulder screws are turned, the cam pushes upward on the screw of the actuator (or on a rod or dowel that transfers this force upward on the screw of the actuator) to preload the actuator (e.g., to prevent actuator motion without any pressure, such as when the balls of the actuator move without moving the screw).

The portion of the press assembly 1700 below the ram platen 1718 includes various components to transfer the pressure applied by the actuator to the one or more mold assemblies 1100 (e.g., via the static weight 1130) and to protect the components of the press assembly 1700 from the heat of the heating elements of the track assembly 800 in zone 2 806. In particular, in the embodiment shown, the press assembly 1700 includes the linear bearing 1722 (for allowing the ram to move downward), the heat shield 1724 and ram insulator 1726 (for protecting the ram from the heat of the heating elements) and the ram head 1728 for contacting the static weight 1130.

Sensors/Computing System

As will be understood from discussions herein, the processing machine 100 may include one or more sensors and/or computing systems. In various embodiments, the processing machine includes one or more thermocouples for measuring a temperature of the one or more heating elements (e.g., the heater cartridges 848A and 848B) and/or mold assemblies (e.g., mold assemblies 1100) of the track assembly 800 and a load cell 1712 for measuring the pressure applied by the actuator 1702. These sensors (and others), in various embodiments, may be connected to a central processing system for reading the information provided by these sensors and, in some embodiments, providing adjustments to the system (e.g., adjusting heat, pressure, etc.). In at least one embodiment, the system is configured to receive sensor readings from the thermocouples and at least one load cell and automatically (or substantially automatically) adjust a temperature of the heat cartridges 848A and 848B and/or the pressure applied by the actuator 1702 to the one or more mold assemblies 1100.

In various embodiments, the processing machine 100 may be configured to automatically or substantially automatically advance or index the mold assemblies based on one or more readings from the sensors of the system. As discussed above, the system may be configured to sense, via a load cell 1712, when pressure is no longer applied to a particular mold assembly when a ram of the press assembly 1700 is at a specific depth (e.g., when a layer of porogen is displaced within a surface of a piece of material, the load cell will register that no pressure is being applied by the ram at a specific depth). Upon receiving an indication that no pressure is being applied from the load cell 1712, the system may be configured to index the mold assemblies 1100 (e.g., to index a next mold assembly to a location under the press assembly 1700 for pressure to be applied the next mold assembly).

In further embodiments, the processing system 100 may include additional sensors and/or processing capabilities. In at least one embodiment, the system includes an automatic porogen dispenser for dispensing a layer of porogen into the one or more mold assemblies 1100 prior to a piece of material being loaded into the one or more mold assemblies 1100 (e.g., prior to the piece of material being placed in contact with the layer of porogen). In some embodiments, the processing system 100 includes at least one robot or computing and mechanical device for placing or removing pieces of material and/or mold inserts from the track assembly 800 (e.g., the system includes a robot or robots for adding and removing the pieces of material for processing and/or the inserts).

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Alternate Embodiments

Alternative embodiments of the system may comprise features that are, in some respects, similar to the various components described above. Selected distinguishing features of these alternative embodiments are discussed below.

Alternate Zones

As discussed above, the track assembly 800 may be divided into one or more heat "zones" where heat is applied to a mold assembly (or multiple mold assemblies). In various embodiments, the system may include many heat zones or a heat zone for each mold assembly (e.g., such that heat to each mold is more precisely controlled). In these embodiments, the system may include many heating elements and/or heating elements that are approximately the size of a single mold assembly. Further, the system may include dynamic heating such that there are no "zones", but temperature can be precisely controlled at any location on the track assembly.

In some embodiments, a mold assembly may include one or more heating elements (e.g., opposed to or in addition to the track assembly including heating elements). In these embodiments, each mold assembly may include an electric resistance heating element (or another type of heating element) that heats a piece of material to a specific temperature. In various embodiments, the heating element of a mold assembly may be controlled by the system via the track assembly control systems. In these embodiments, the mold assembly may be configured such that the track assembly control systems control the heat of the mold assembly when the mold assembly is in contact with the track assembly (e.g., through electrical contacts on the mold assembly or the like). In some embodiments, the mold assemblies may include heating controls and sensors and/or may wirelessly connect to a remote control system.

According to particular embodiments, the system includes an alternate form of heating, such as convection heating. In these embodiments, the system may include ovens, boilers, furnaces, heat lamps, etc. which subject the mold assemblies to heat as they pass through a heating area (e.g., zone). As a particular example, the system may include one or more oven structures where the mold assemblies travel through the one or more oven structures and are heated by the air within these structures. In these embodiments (and others), the mold assemblies may be configured such that multiple surfaces of materials are processed to include pores (e.g., each mold assembly is loaded with at least one piece of material for processing and multiple surfaces are processed at substantially the same time because heat may be applied to multiple (or all) surfaces of the at least one piece of material through convention heating).

For example, the system may include a particular oven heating structure, where the internal air of the structure is heated through any suitable mechanism (electrical heating, boiler, furnace, etc.). Further, in this example, at least a portion of a track assembly passes through the oven heating structure, transporting mold assemblies through the oven heating structure and heating the pieces of material included in the mold assemblies as they are passed through the oven heating structure. In this way, in this example, multiple surfaces of the pieces of material that are included in the mold assemblies are heated.

Alternate Track Assemblies

As will be understood from discussions herein, the track assembly 800 is merely exemplary and other suitable track assemblies may be constructed. In various embodiments, an alternate track assembly may include a conveyor belt opposed to indexers (e.g., indexers 802). In some embodiments, a second alternate track assembly includes the mold assemblies as integral parts of the track (e.g., mold assemblies are not removable). In further embodiments, alternate track assemblies utilize magnets, solenoids, pulleys, rollers, chain conveyors, wire mesh conveyors, vibrating conveyors, pneumatic conveyors, screw conveyors, drag conveyors, and/or gravity to move mold assemblies.

A track assembly may be configured to move mold assemblies along any suitable path of travel. In some embodiments, the track assembly may move mold assemblies in a linear direction and pieces of material may be processed along this linear path. In various embodiments, a track assembly may be configured to move mold assemblies along a path of travel that is substantially circular, substantially rectangular, substantially square, or any other suitable path of travel (e.g., a spiral, an undefined shape, a combination of shapes, etc.).

Alternate Static Weight

As discussed above, the static weight is a weight that applies a constant pressure to a piece of material loaded into a mold assembly (e.g., to press a surface of the piece of material onto a layer of porogen while heat is applied to the surface of the piece of material). Further, as discussed above, the static weight applies approximately 0.1 to 10 PSI to a piece of material. In alternate embodiments, the static weight applies more pressure a piece of material, such as, for example, about 200 PSI. In these alternate embodiments, the system may configured such that the press assembly is a quality control device to make sure that the porogen has displaced through the surface of the piece of material (e.g., the press assembly does apply additional pressure the piece of material because the static weight has applied sufficient pressure to the piece of material to displace the porogen through the surface).

In further embodiments, the system does not include a static weight. In these embodiments (and others), the system may be configured to apply more pressure to the piece of material via a press assembly (e.g., the press assembly 1700) and/or to apply pressure to the piece of material via multiple press assemblies (which may be arranged in any suitable way around a track assembly).

Alternate Mold Assemblies

The number of mold assemblies may vary. In particular embodiments, the track assembly is configured to support approximately twelve mold assemblies along a particular length of the track. In some embodiments, the track assembly is configured to support more mold assemblies, such as twenty, thirty, or fifty mold assemblies, etc. In further embodiments, the track assembly is configured to support less mold assemblies, such as one, two, or ten mold assemblies along a particular portion of the track.

The mold assemblies may have an alternate structure. In some embodiments, the mold assembles may not include a removable insert (e.g., the outer mold and the insert are an integral piece). In various embodiments, the mold assemblies do not include pegs as shown in the figures, but include another mechanism for receiving a static weight, such as a magnet (or magnets), holes (e.g., where the static weight includes pegs), a single peg (opposed to two pegs), more than two pegs, slots, notches, etc.

Further Alternate Embodiments

According to particular embodiments, a method for processing a material includes: 1) providing a press assembly including a ram and a load cell for measuring displacement of a layer of porogen through a surface of a piece of material; 2) providing the piece of material, wherein the piece of material has been heated to a particular processing temperature for a predetermined amount of time within a mold assembly; 3) applying pressure via the press assembly ram to the piece of material via the mold assembly until the load cell measures that there is no pressure being applied to the piece of material and therefore the layer of porogen has displaced through the surface of the piece of material; and 4) removing the piece of material from the mold assembly.

In particular aspects, a mold assembly for processing a piece of material includes: 1) a substantially rectangular mold base with a void for receiving a mold insert and one or more pegs for receiving a static weight; 2) the mold insert for being loaded into the mold base void, where the mold insert includes a non-through void for receiving a layer of ionic solid porogen and a piece of thermoplastic for processing; 3) the static weight for being loaded onto the piece of thermoplastic for applying constant pressure to the thermoplastic, wherein the mold assembly is configured for being subjected to heat for processing the piece of thermoplastic.

CONCLUSION

The foregoing description of the exemplary embodiments has been presented only for the purposes of illustration and description and is not intended to be exhaustive or to limit the systems to the precise forms disclosed. Many modifications and variations are possible in light of the above teaching.

The embodiments were chosen and described in order to explain the principles of the systems and their practical application so as to enable others skilled in the art to utilize the systems and various embodiments and with various modifications as are suited to the particular use contemplated. Alternative embodiments will become apparent to those skilled in the art to which the present systems pertain without departing from their spirit and scope.

What is claimed is:

1. An apparatus for processing a material, the apparatus comprising:
   a work bench assembly;
   a mold assembly, the mold assembly comprising:
      an outer mold body defining an opening for receiving a mold insert;
      the mold insert comprising a void for receiving porogen and a piece of thermoplastic material; and
      a static weight for applying pressure to the piece of thermoplastic material;

a track assembly operatively connected to the work bench assembly, the track assembly comprising:
a frame;
at least one track guide operatively connected to the frame, the at least one track guide defining a path of travel for the mold assembly;
at least one heat source located under the at least one track guide, wherein the at least one heat source heats the mold assembly to at least one predetermined processing temperature;
a wear bar operatively connected to the frame, the wear bar configured to conduct heat from the at least one heat source and support the mold assembly as it is moved along the path of travel; and
one or more indexers for moving the mold assembly along the path of travel; and
a press assembly operatively connected to the work bench assembly, the press assembly for applying pressure to the piece of thermoplastic material, wherein the pressure applied by the press is in addition to the pressure applied by the static weight.

2. The apparatus of claim 1, wherein:
the outer mold body comprises one or more pegs; and
the static weight comprises one or more holes corresponding to the one or more pegs, wherein the static weight is received by the outer mold body via the one or more pegs.

3. The apparatus of claim 1, wherein the mold insert void comprises a non-through cavity, wherein the non-through cavity comprises a particular shape.

4. The apparatus of claim 3, wherein the particular shape of the non-through cavity comprises a shape of a lumbar spinal cage.

5. The apparatus of claim 3, wherein the particular shape of the non-through cavity comprises a shape of a cervical spinal cage.

6. The apparatus of claim 3, wherein the mold insert forms a protrusion within a perimeter of the non-through cavity.

7. The apparatus of claim 3, wherein the non-through cavity comprises an outer perimeter with four rounded corners.

8. The apparatus of claim 3, wherein the non-through cavity comprises an outer perimeter with at least one curved portion.

9. The apparatus of claim 3, wherein the non-through cavity comprises an outer perimeter and an inner perimeter, wherein the outer perimeter is shaped to receive an outer surface of a medical device and the inner perimeter is shaped to receive an inner surface of the medical device.

10. A track assembly for processing a material, the track assembly comprising:
a frame;
at least one track guide operatively connected to the frame, the at least one track guide defining a path of travel for a mold assembly;
at least one heat source located under the at least one track guide, wherein the at least one heat source heats the mold assembly to at least one predetermined processing temperature; and
a wear bar operatively connected to the frame, the wear bar configured to conduct heat from the at least one heat source and support the mold assembly as it is moved along the path of travel.

11. The track assembly of claim 10, wherein the mold assembly comprises:
an outer mold body defining an opening for receiving a mold insert; and
the mold insert comprising a void for receiving a layer of porogen and a piece of thermoplastic material.

12. The track assembly of claim 11, wherein:
the outer mold body comprises one or more pegs; and
the apparatus further comprises a static weight, the static weight comprising one or more holes corresponding to the one or more pegs, wherein the static weight is received by the outer mold body via the one or more pegs.

13. The track assembly of claim 11, wherein the mold insert void comprises a non-through cavity, wherein the non-through cavity comprises a particular shape.

14. The track assembly of claim 13, wherein the particular shape of the non-through cavity comprises a shape of a lumbar spinal cage.

15. The track assembly of claim 13, wherein the particular shape of the non-through cavity comprises a shape of a cervical spinal cage.

16. The track assembly of claim 13, wherein the mold insert forms a protrusion within a perimeter of the non-through cavity.

17. The track assembly of claim 13, wherein the non-through cavity comprises an outer perimeter with four rounded corners.

18. The track assembly of claim 13, wherein the non-through cavity comprises an outer perimeter with at least one curved portion.

19. The track assembly of claim 13, wherein the non-through cavity comprises an outer perimeter and an inner perimeter, wherein the outer perimeter is shaped to receive an outer surface of a medical device and the inner perimeter is shaped to receive an inner surface of the medical device.

20. An apparatus for processing a material, the apparatus comprising:
a mold assembly, the mold assembly comprising a void substantially shaped for receiving a medical device, wherein the void comprises a non-through cavity; and
a track assembly comprising:
a frame;
at least one track guide operatively connected to the frame, the at least one track guide defining a path of travel for the mold assembly;
a wear bar operatively connected to the frame, the wear bar configured to support the mold assembly as it is moved along the path of travel; and
at least one heat source operative for heating the mold assembly to at least one predetermined processing temperature.

21. The apparatus of claim 20, wherein:
the mold assembly comprises one or more pegs; and
the apparatus further comprises a static weight, the static weight comprising one or more holes corresponding to the one or more pegs, wherein the static weight is received by the mold assembly via the one or more pegs.

22. The apparatus of claim 20, wherein the void comprises a protrusion within a perimeter of the non-through cavity.

23. The apparatus of claim 22, wherein the void comprises an outer perimeter with four rounded corners.

24. The apparatus of claim 23, wherein the void comprises an outer perimeter with at least one curved portion.

25. The apparatus of claim 20, wherein the void comprises an outer perimeter and an inner perimeter, wherein the outer perimeter is shaped to receive an outer surface of the medical device and the inner perimeter is shaped to receive an inner surface of the medical device.

26. The apparatus of claim 20, wherein the medical device is a lumbar spinal cage.

27. The apparatus of claim 20, wherein the medical device is a cervical spinal cage.

28. The apparatus of claim 20, wherein the apparatus further comprises a press assembly operatively connected to the track assembly, the press assembly for applying pressure to the medical device.

* * * * *